(12) United States Patent
Su

(10) Patent No.: US 10,314,035 B2
(45) Date of Patent: Jun. 4, 2019

(54) SUB-FRAME ALLOCATION FOR LOW POWER LTE

(71) Applicant: Apple Inc., Cupertino, CA (US)

(72) Inventor: Li Su, San Jose, CA (US)

(73) Assignee: Apple Inc., Cupertino, CA (US)

( * ) Notice: Subject to any disclaimer, the term of this patent is extended or adjusted under 35 U.S.C. 154(b) by 110 days.

(21) Appl. No.: 14/967,450

(22) Filed: Dec. 14, 2015

(65) Prior Publication Data

US 2016/0198461 A1 Jul. 7, 2016

Related U.S. Application Data

(60) Provisional application No. 62/100,060, filed on Jan. 5, 2015.

(51) Int. Cl.
*H04W 72/04* (2009.01)
*H04W 52/02* (2009.01)
(Continued)

(52) U.S. Cl.
CPC ....... *H04W 72/0446* (2013.01); *H04L 5/0007* (2013.01); *H04L 5/0037* (2013.01); *H04W 52/0216* (2013.01); *H04W 52/0229* (2013.01); *H04W 52/0251* (2013.01); *H04W 52/0261* (2013.01); *H04W 72/0413* (2013.01); *H04W 72/10* (2013.01); *H04W 76/28* (2018.02); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01);
(Continued)

(58) Field of Classification Search
CPC .................................................. H04W 72/0446
See application file for complete search history.

(56) References Cited

U.S. PATENT DOCUMENTS

| 8,155,032 B2 | 4/2012 | Lindoff et al. |
| 2010/0091726 A1 | 4/2010 | Ishii et al. |
| (Continued) | | |

FOREIGN PATENT DOCUMENTS

| WO | 2014110692 | 7/2014 |
| WO | 2014110981 A1 | 7/2014 |
| WO | 2015115988 A1 | 8/2015 |

OTHER PUBLICATIONS

International Search Report & Written Opinion, Application No. PCT/US2015/065746, dated Mar. 9, 2016, 12 pages.
(Continued)

*Primary Examiner* — Zhensheng Zhang
(74) *Attorney, Agent, or Firm* — Meyertons Hood Kivlin Kowert & Goetzel, P.C.; Jeffrey C. Hood; Brian E. Moore

(57) ABSTRACT

In some embodiments, a user equipment (UE) and base station implement improved communication methods which enable a UE to operate according to a sub-frame allocation based on its current power state. The UE may transmit information including a maximum number of uplink (UL) sub-frames the UE can transmit in an allocation period and receive, from a base station, a first sub-frame allocation based on at least the first information. In embodiments, the UE may merge an un-allocated UL sub-frame's downlink association set with a next closest allocated UL sub-frame's downlink association set.

20 Claims, 18 Drawing Sheets

(51) Int. Cl.
*H04L 5/00* (2006.01)
*H04W 72/10* (2009.01)
*H04W 76/28* (2018.01)

(52) U.S. Cl.
CPC ............ *Y02D 70/168* (2018.01); *Y02D 70/23* (2018.01); *Y02D 70/26* (2018.01)

(56) References Cited

U.S. PATENT DOCUMENTS

| | | | |
|---|---|---|---|
| 2010/0303022 A1 | 12/2010 | Maas et al. | |
| 2010/0331037 A1 | 12/2010 | Jen | |
| 2011/0009143 A1* | 1/2011 | Kim | H04W 72/1278 455/509 |
| 2011/0310937 A1* | 12/2011 | Lin | H04L 5/001 375/219 |
| 2012/0147902 A1* | 6/2012 | Kim | H04W 28/06 370/474 |
| 2013/0250882 A1* | 9/2013 | Dinan | H04W 72/0426 370/329 |
| 2014/0355461 A1* | 12/2014 | Aldana | G01S 5/00 370/252 |
| 2014/0369292 A1* | 12/2014 | Wu | H04W 72/04 370/329 |
| 2015/0085719 A1 | 3/2015 | Yin et al. | |
| 2015/0189574 A1* | 7/2015 | Ng | H04W 24/08 370/252 |
| 2015/0195791 A1* | 7/2015 | Jiang | H04W 52/143 455/522 |
| 2016/0192388 A1* | 6/2016 | Ekpenyong | H04W 72/1284 370/329 |

OTHER PUBLICATIONS

First Examination Report, German Patent application 11 2015 005 888.5, dated Oct. 19, 2018, 10 pages.

\* cited by examiner

| TDD UL/DL Configuration | sfn0 | sfn1 | sfn2 | sfn3 | sfn4 | sfn5 | sfn6 | sfn7 | sfn8 | sfn9 |
|---|---|---|---|---|---|---|---|---|---|---|
| 0 | D | S | U | U | U | D | S | U | U | D |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | S | U | U | D |
| 6 | D | S | U | U | U | D | S | U | U | D |

FIG. 6A
(Prior Art)

| TDD UL/DL Configuration | sfn0 | sfn1 | sfn2 | sfn3 | sfn4 | sfn5 | sfn6 | sfn7 | sfn8 | sfn9 |
|---|---|---|---|---|---|---|---|---|---|---|
| 0 | - | - | 6 | - | 4 | - | - | 6 | - | 4 |
| 1 | - | - | 7,6 | 4 | - | - | - | 7,6 | 4 | - |
| 2 | - | - | 8,7,4,6 | - | - | - | - | 8,7,4,6 | - | - |
| 3 | - | - | 7,6,11 | 6,5 | 5,4 | - | - | - | - | - |
| 4 | - | - | 12,8,7,11 | 6,5,4,7 | - | - | - | - | - | - |
| 5 | - | 13,12,9,8,7,5,4,11,6 | - | - | - | - | - | - | - | - |
| 6 | - | - | 7 | 7 | 5 | - | - | 7 | 7 | - |

FIG. 6B
(Prior Art)

| TDD UL/DL Configuration | sfn0 | sfn1 | sfn2 | sfn3 | sfn4 | sfn5 | sfn6 | sfn7 | sfn8 | sfn9 |
|---|---|---|---|---|---|---|---|---|---|---|
| 0 | 4 | 6 | | | | 4 | 6 | | | |
| 1 | | 6 | | | 4 | | 6 | | 4 | 4 |
| 2 | | | | 4 | | | | | 4 | 4 |
| 3 | 4 | | | | | | | | 4 | 4 |
| 4 | | | | | | | | | 4 | 4 |
| 5 | | | | | | | | | 4 | 5 |
| 6 | 7 | 7 | | | | 7 | 7 | | | |

1201: HD FDD UL/DL Configuration 0: UL Allocation: n

FIG. 9A

1202a: HD FDD UL/DL Configuration 1: UL Allocation: n, n+i, i=1,2,3,4

1202b: HD FDD UL/DL Configuration 1: UL Allocation: n, n+i, i=1,2,3,4

1202c: HD FDD UL/DL Configuration 1: UL Allocation: n, n+i, i=1,2,3,4

FIG. 9B

1203a: HD FDD UL/DL Configuration 2: UL Allocation: n, n+i, n+j, i=1,2,3,4; j=1,2,3,4

1203b: HD FDD UL/DL Configuration 2: UL Allocation: n, n+i, n+j, i=1,2,3,4; j=1,2,3,4

1203c: HD FDD UL/DL Configuration 2: UL Allocation: n, n+i, n+j, i=1,2,3,4; j=1,2,3,4

FIG. 9C

SUB-FRAME ALLOCATION FOR LOW POWER LTE

PRIORITY DATA

This application claims benefit of priority to U.S. Provisional Application Ser. No. 62/100,060, titled "Sub-Frame Allocation for Low Power LTE", filed Jan. 5, 2015 by Li Su, which is hereby incorporated by reference in its entirety as though fully and completely set forth herein.

FIELD

The present application relates to wireless cellular communication, and more particularly, to methods for allocating sub-frames for reducing power consumption in a radio access technology such as LTE.

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication. In particular, the large amount of functionality present in a user equipment (UE), e.g., a wireless device such as a cellular phone, can place a significant strain on the battery life of the UE.

In order to support LTE cellular technology in low power applications, various basic issues should be considered. First, in low power applications there will a limited RF range for both transmit (TX) and receive (RX). In addition, there will be limited power, including both limited peak power and limited average TX power.

Further, it is desirable that any solution to address low power applications be compatible/extendable to the existing LTE network, preferably with minimum to no impact on LTE network capacity or on LTE physical layers allowing easier implementation.

Therefore, improvements in the field would be desirable.

SUMMARY

Embodiments are presented herein of, inter alia, a user equipment (UE), base station (eNB), and improved communication methods which enable the UE to operate according to a sub-frame allocation based on its power state are presented as well as improved communication methods which enable the UE to request a frame allocation based on current or anticipated power states.

Some embodiments relates to a user equipment device (UE) comprising at least one antenna, at least one radio, and one or more processors coupled to the radio. The at least one radio is configured to perform cellular communication using at least one radio access technology (RAT). The one or more processors and the at least one radio are configured to perform voice and/or data communications, as well as the methods described herein.

In some embodiments, a UE transmits information including a maximum number of uplink (UL) sub-frames the UE can transmit in an allocation period and receives, from a base station, a first sub-frame allocation based on at least the first information. In embodiments, the UE merges an un-allocated UL sub-frame's downlink association set with a next closest allocated UL sub-frame's downlink association set.

In some embodiments, the UE receives a downlink assignment index (DAI). The DAI represents a total number of downlink (DL) sub-frames to be acknowledged/not acknowledged (ACK/NAK) in a merged downlink association set for downlink control information (DCI) format 0 and a cumulative number of DL sub-frames to be ACK/NAK in the merged downlink association set for DCI format x. The merged downlink association set comprises the un-allocated UL sub-frame's downlink association set and the next closest allocated UL sub-frame's downlink association set.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 6A-6C illustrate sub-frame allocations and ACK/NAK association sets according to the prior art.

FIG. 7A illustrates TDD sub-frame allocations based on TX duty cycle for TDD UL/DL configuration 0, according to some embodiments.

FIG. 7G illustrates TDD sub-frame allocations based on TX duty cycle for TDD UL/DL configuration 6, according to some embodiments.

FIG. 9A illustrates HD FDD sub-frame allocations based on TX duty cycle for HD FDD UL/DL configuration 0, according to some embodiments.

FIG. 9B illustrates HD FDD sub-frame allocations based on TX duty cycle for HD FDD UL/DL configuration 1, according to some embodiments.

FIG. 9C illustrates HD FDD sub-frame allocations based on TX duty cycle for HD FDD UL/DL configuration 2, according to some embodiments.

Figure 1:
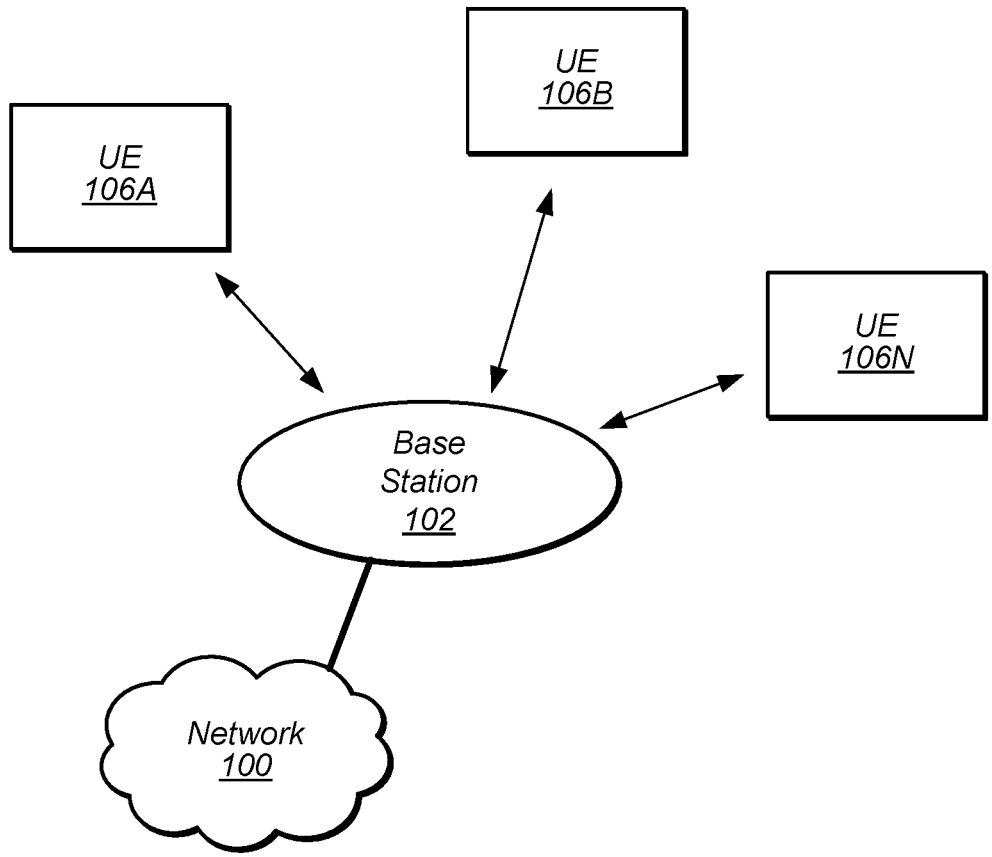
FIG. 1 illustrates a wireless cellular communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates a wireless cellular communication system, according to some embodiments. It is noted that FIG. 1 represents one possibility among many and that features of the present disclosure may be implemented in any of various systems, as desired.

As shown, the wireless communication system includes a base station 102A which communicates over a transmission medium with one or more wireless devices 106A, 106B, etc., through 106N. Wireless devices may be user devices, which may be referred to herein as "user equipment" (UE) or UE devices.

The base station 102 may be a base transceiver station (BTS) or cell site, and may include hardware that enables wireless communication with the UE devices 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and/or between the UE devices 106 and the network 100.

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and similar devices over a wide geographic area via one or more cellular communication technologies.

Thus, while base station 102 may presently represent a "serving cell" for wireless devices 106A-N as illustrated in FIG. 1, each UE device 106 may also be capable of receiving signals from one or more other cells (e.g., cells provided by other base stations), which may be referred to as "neighboring cells". Such cells may also be capable of facilitating communication between user devices and/or between user devices and the network 100.

Note that at least in some instances a UE device 106 may be capable of communicating using multiple wireless communication technologies. For example, a UE device 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication technologies (including more than two wireless communication technologies) are also possible. Likewise, in some instances a UE device 106 may be configured to communicate using only a single wireless communication technology.

Figure 2:
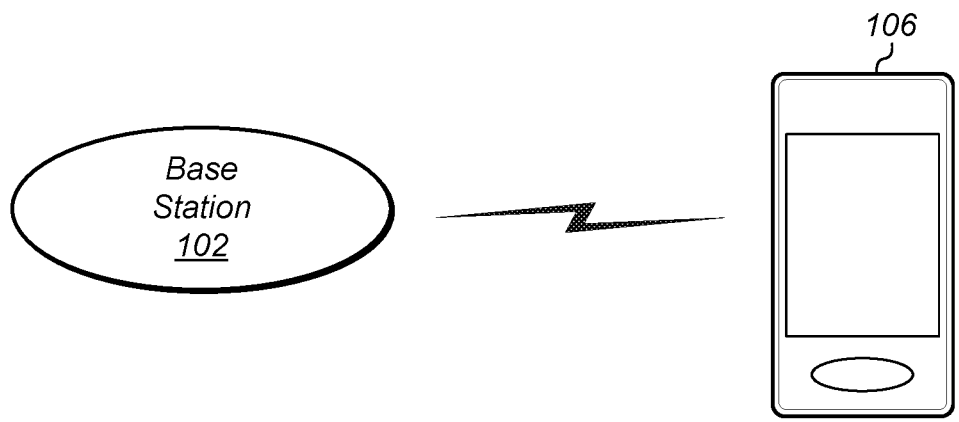
FIG. 2 illustrates a base station ("BS", or in the context of LTE, an "eNodeB" or "eNB") in communication with a wireless device, according to some embodiments.

FIG. 2 illustrates a base station ("BS", or in the context of LTE, an "eNodeB" or "eNB") in communication with a wireless device such as UE device 106 (e.g., one of the devices 106A through 106N), according to some embodiments. The UE device 106 may have cellular communication capability, and as described above, may be a device such as a mobile phone, a hand-held device, a media player, a computer, a laptop or a tablet, or virtually any type of wireless device.

The UE device 106 may include a processor that is configured to execute program instructions stored in memory. The UE device 106 may perform any of the method embodiments described herein by executing such stored instructions. Alternatively, or in addition, the UE device 106 may include a programmable hardware element such as an FPGA (field-programmable gate array), or other circuitry, that is configured to perform any of the method embodiments described herein, or any portion of any of the method embodiments described herein.

In some embodiments, the UE device 106 may be configured to communicate using any of multiple radio access technologies and/or wireless communication protocols. For example, the UE device 106 may be configured to communicate using one or more of GSM, UMTS, CDMA2000, LTE, LTE-A, WLAN, Wi-Fi, WiMAX or GNSS. Other combinations of wireless communication technologies are also possible.

The UE device 106 may include one or more antennas for communicating using one or more wireless communication protocols or technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of LTE or 1×RTT (or LTE or GSM), and separate radios for communicating using each of Wi-Fi and Bluetooth. Other configurations are also possible.

Figure 3:
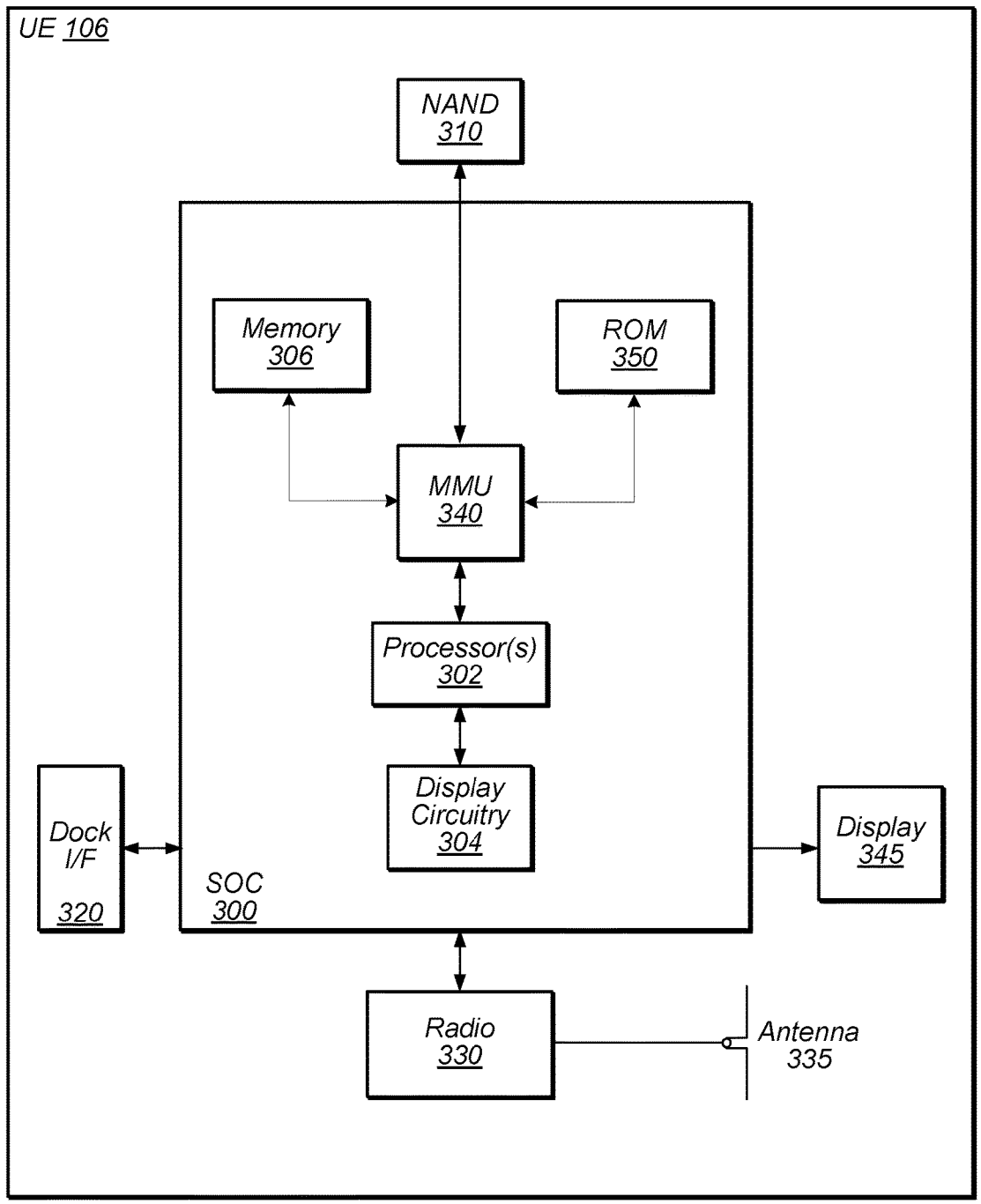
FIG. 3 illustrates a block diagram for a user equipment device, according to some embodiments.

FIG. 3—Example Block Diagram of a UE

FIG. 3 illustrates a block diagram of a user equipment device (UE), such as UE 106, according to some embodiments. As shown, the UE 106 may include a system on chip (SOC) 300, which may include portions for various purposes. For example, as shown, the SOC 300 may include processor(s) 302 which may execute program instructions for the UE 106, and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310). The MMU 340 may be configured to perform memory protection and page table translation or set up. In some embodiments, the MMU 340 may be included as a portion of the processor(s) 302.

The UE 106 may also include other circuits or devices, such as the display circuitry 304, radio 330, connector I/F (dock) 320, and/or display 345.

In some embodiments, ROM 350 may include a bootloader, which may be executed by the processor(s) 302 during boot up or initialization. In addition, the SOC 300 may be coupled to various other circuits of the UE 106. For example, the UE 106 may include various types of memory (e.g., including NAND flash 310), a connector interface (dock) 320 (e.g., for coupling to a computer system), the display 345, and wireless communication circuitry such as radio 330 (e.g., for communication using LTE, CDMA2000, Bluetooth, WiFi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, in some embodiments, the UE may be configured to communicate wirelessly using a plurality of wireless communication standards.

As described herein, the UE 106 may include hardware and software components for implementing methods according to embodiments of this disclosure.

In addition, the processor 302 of the UE device 106 may be configured to implement part or all of the methods described herein, e.g., by executing program instructions stored on a memory medium (e.g., a non-transitory computer-readable memory medium). In some embodiments, processor 302 may be configured as a programmable hardware element, such as an FPGA (Field Programmable Gate Array), or as an ASIC (Application Specific Integrated Circuit).

In addition, as described herein, processor 302 may be comprised of one or more processing elements. In other words, one or more processing elements may be included in processor 302. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor 302.

Further, as described herein, radio 330 may be comprised of one or more processing elements. In other words, one or more processing elements may be included in radio 330. Thus, radio 330 may include one or more integrated circuits (ICs) that are configured to perform the functions of radio 330. In addition, each integrated circuit may include circuitry (e.g., first circuitry, second circuitry, etc.) configured to perform the functions of radio 330.

Figure 4:
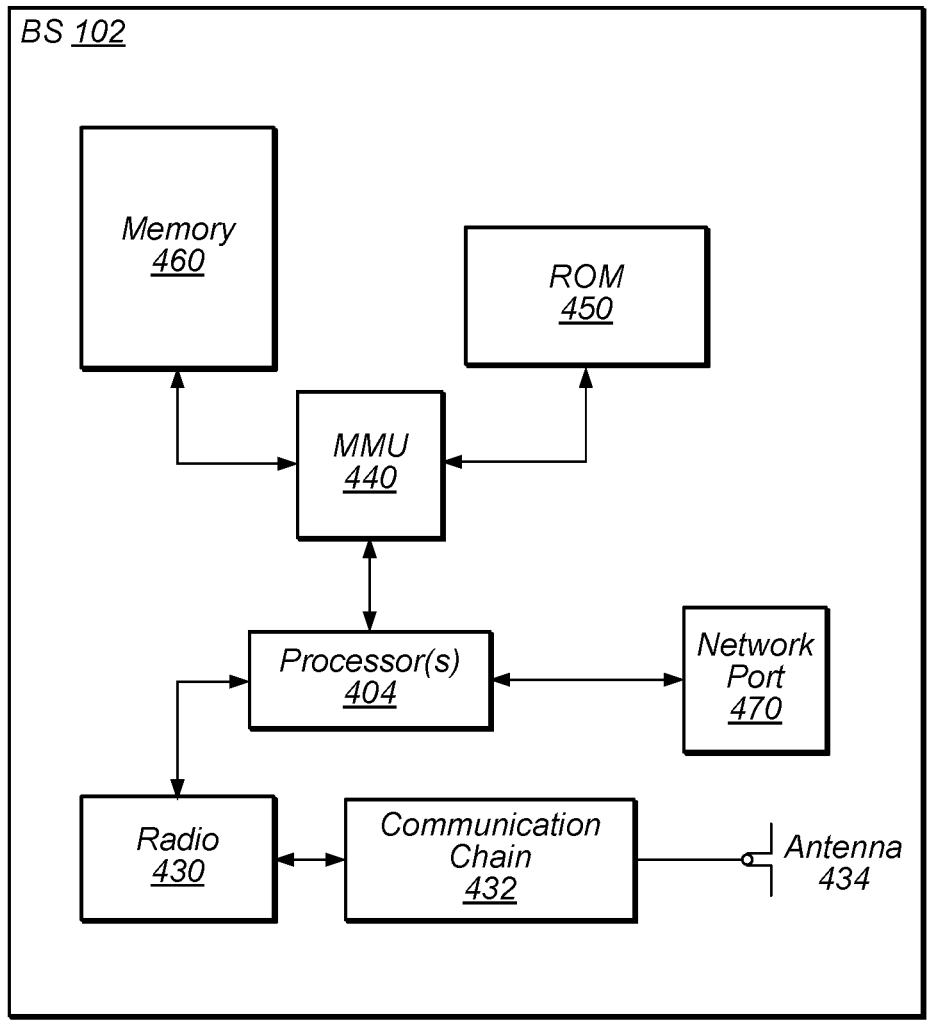
FIG. 4 illustrates a block diagram for a base station, according to some embodiments.

FIG. 4—Base Station

FIG. 4 illustrates a base station 102, according to some embodiments. It is noted that the base station of FIG. 4 is merely one example of a possible base station. As shown, base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430, a communication chain 432 and at least one antenna 434. The base station may be configured to operate as a wireless transceiver and may be further configured to communicate with UE devices 106 via radio 430, communication chain 432 and the at least one antenna 434. Communication chain 432 may be a receive chain, a transmit chain or both. The radio 430 may be configured to communicate via various RATs, including, but not limited to, GSM, UMTS, LTE, WCDMA, CDMA2000, WiMAX, etc.

The processor(s) 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Channels in LTE

LTE uses various channels so that data can be transported across the LTE radio interface. These channels are used to segregate the different types of data and allow them to be transported across the radio access network in an orderly fashion. The different channels effectively provide interfaces to the higher layers within the LTE protocol structure, and enable an orderly and defined segregation of the data.

There are three categories or types of LTE data channels as follows.

Physical channels: These are transmission channels that carry user data and control messages.

Transport channels: The physical layer transport channels offer information transfer to Medium Access Control (MAC) and higher layers.

Logical channels: Provide services for the Medium Access Control (MAC) layer within the LTE protocol structure.

LTE defines a number of physical downlink channels to carry information from the base station to the UE. The LTE downlink comprises a physical downlink shared channel (PDSCH) and a physical downlink control channel (PDCCH). The PDSCH is the downlink channel that carries all user data and all signaling messages. The PDSCH is the main data bearing channel which is allocated to users on a dynamic and opportunistic basis. The PDCCH carries the layer one control for the shared channel. Thus, the PDSCH is the key channel for communicating information to the UE, and the PDCCH communicates metadata for the information, e.g., "who" the data is for, "what" data is sent, and "how" the data is sent over the air in the PDSCH.

LTE also defines a number of physical uplink channels to carry information from the UE to the base station. The LTE uplink comprises a physical uplink shared channel (PUSCH) and a physical uplink control channel (PUCCH). The PUSCH is the uplink counterpart to the PDSCH. The PUCCH provides the various control signaling requirements for uplink communications. For example, the PUCCH is used for DL acknowledge/not acknowledge (ACK/NAK). Additionally, the PUCCH is used for periodically transmission of DL channel quality index (CQI), scheduling requests (SR), and sounding reference signals (SRS).

As described above, in LTE the base station (eNB) assigns UL resources using the PDCCH, wherein this assignment of resources is called a UL grant. The UL grant may be a type of persistent UL grant such as a semi-persistent scheduling (SPS) UL grant. The persistent or semi-persistent UL grant may be configured by radio resource control (RRC) layer signaling and the UE may be configured with SPS by the eNB, and then the eNB may activate the UE to use SPS. Persistent or semi-persistent UL grants, such as SPS, allows for a persistent, periodic UL grant. Thus, the UE may transmit new information periodically without receiving a new UL grant for each transmission. Alternatively, the UL grant may be for a specified amount of information, and the eNB may send additional UL grants based on scheduling requests from the UE.

Figure 5:
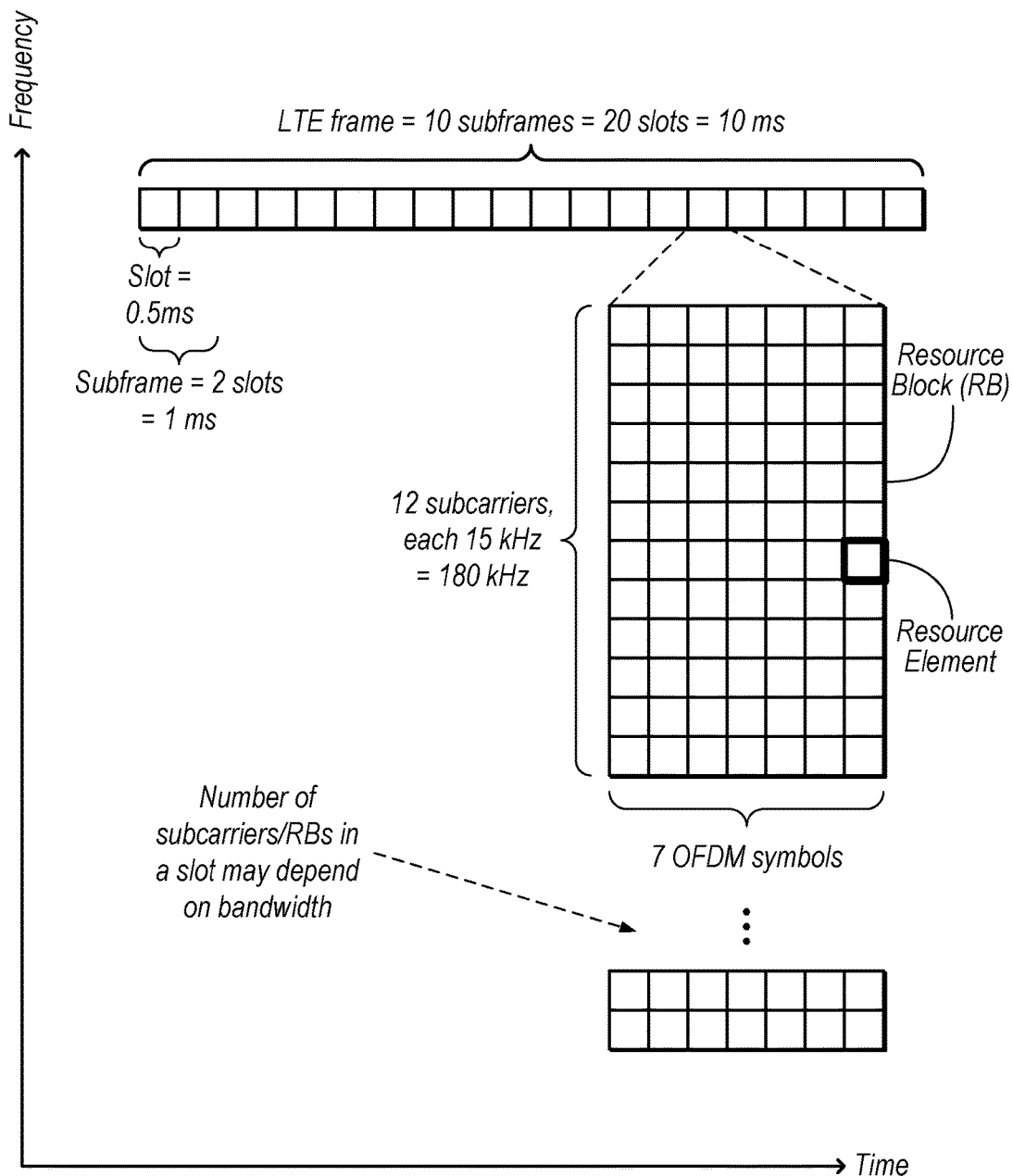
FIG. 5 illustrates a diagram that shows an exemplary LTE frame.

FIG. 5—Example LTE Frame

Various embodiments disclosed herein may utilize LTE frames and/or variations thereof. FIG. 5 shows a diagram illustrating one example of an LTE radio frame. In the illustrated embodiment, each LTE frame covers 10 ms in the time dimension and multiple subcarriers in the frequency dimension (the number of subcarriers may depend on available bandwidth). In the illustrated embodiment, each frame includes 10 sub-frames which each include two slots. In the illustrated embodiment, each slot includes one or more resource blocks (RBs) that in turn comprise a 7×12 array of seven orthogonal frequency-division multiplexing (OFDM) symbols by 12 subcarriers. As shown, the number of sub-carriers/RBs in a slot may depend on bandwidth. Typically, a block corresponding to a particular symbol and subcarrier is referred to as a "resource element."

FIGS. 6A-6C—TDD UL/DL Frame Configurations

In current LTE 3GPP specifications (e.g., Rel-8 through Rel-12), 7 time division duplex (TDD) uplink/downlink (UL/DL) frame configurations are defined. They are statically configured across all intra frequency cells. The LTE frame may have a periodicity of 5 or 10 milliseconds (ms). According to the current specifications, all UEs use the same static TDD UL/DL configuration in a TDD cell. FIG. 6A illustrates the 7 TDD UL/DL frame configurations according to the specifications. As shown, each frame includes 10 sub-frames (sfn0-sfn9), with each sub-frame designated for uplink (U or UL), downlink (D or DL), or special (S). Note that a special sub-frame is used to transition from a downlink sub-frame to an uplink sub-frame but not necessary when the UE transitions from an uplink sub-frame to a downlink sub-frame.

FIG. 6B illustrates acknowledge (ACK) and negative acknowledge (NAK) downlink association set index, K, as defined in the current LTE 3GPP specifications association sets for each sub-frame of each TDD UL/DL frame, where K: {k0, k1, . . . km−1}. For example, for configuration 1 which has a standard allocation of DSUUDDSUUD (see FIG. 6A), sub-frame 2 has an allocation set of {6, 7}, sub-frame 3 has an allocation set of {4}, and so forth.

FIG. 6C illustrates adjustments to the downlink association set index, K, according to the current LTE 3GPP specifications. For example, as explained in the current LTE 3GPP specifications, for TDD UL/DL configurations 1-6 and normal HARQ operation, the UE shall upon detection of a PDCCH with DCI format 0 and/or a PHICH transmission in sub-frame n intended for the UE, adjust the corresponding PUSCH transmission in sub-frame n+K, with K given in the table illustrated in FIG. 6C. As another example, for TDD UL/DL configuration 0 and normal HARQ operation the UE shall upon detection of a PDCCH with DCI format 0 and/or a PHICH transmission in sub-frame n intended for the UE, adjust the corresponding PUSCH transmission in sub-frame n+K if the MSB of the UL index in the DCI format 0 is set to 1 or PHICH is received in sub-frame n=0 or 5, with K given in the table illustrated in FIG. 6C. As another example, if, for TDD UL/DL configuration 0 and normal HARQ operation, the LSB of the UL index in the DCI format 0 is set to 1 in sub-frame n or a PHICH is received in sub-frame n=0 or 5 or PHICH is received in sub-frame n=1 or 6, the UE shall adjust the corresponding PUSCH transmission in sub-frame n+7. However, if, for TDD UL/DL configuration 0, both the MSB and LSB of the UL index in the DCI format 0 are set in sub-frame n, the UE shall adjust the corresponding PUSCH transmission in both sub-frames n+k and n+7, with K given in the table illustrated in FIG. 6C.

Dynamic UL Sub-frame Allocation for TDD Low Power LTE

As mentioned above, in order to support LTE cellular technology in low power devices (i.e., UE's that are power limited and/or power restricted due to battery size or batter charge, among other reasons), various basic issues should be considered. First, low power devices may have limited RF range in both transmit (TX) and receive (RX). Additionally, low power devices may have both limited peak and average TX power for UL communications. Further, support for low power devices should be compatible with, or an extension of, current 3GPP LTE standards. In addition, support for low power devices should have minimal or no impact on LTE network capacity and LTE physical layers. In other words, support for low power devices should be devised as to ease implementation.

Thus, in some embodiments, a low power device (e.g., such as UE 106 described above) may conserve battery drain (or reduce power consumption) with the implementation of a transmit (TX) duty cycle. In other words, to prevent quick battery current drain due to consecutive transmissions in higher TX power conditions, a TX duty cycle may be used by the low power device. In such embodiments, the number of sub-frames in which the low power device may transmit may be reduced. Additionally, a number of TX sub-frames (i.e., UL sub-frames in which the low power device transmits) in a TX duty cycle period may be related to the TX power of the TX sub-frames. For example, in a duty cycle period, only one or N (e.g., a number greater than 1, in other words, one or more) TX sub-frames may be transmitted in maximum TX power. Further, the number of TX sub-frames (contiguous or non-contiguous) in a duty cycle period may increase as the TX power decreases. In other words, as the power requirements for transmission decreases, the more times (i.e., more often) a low power device may transmit in a duty cycle. Thus, a relationship between the number of TX sub-frames and corresponding TX power may be defined and quantified. Note that in some embodiments, under certain TX power threshold conditions, contiguous TX in a duty cycle period may be allowed. Additionally, in some embodiments, the TX duty cycle period may be extended as needed; for example, due to heavy system usage or battery state of charge (e.g., the batter power runs low).

Note that since the TDD LTE UL/DL frame configuration has 5 ms or 10 ms periodicity, the TX duty cycle period should be chosen as a multiple of 10 milliseconds (ms) (e.g., N*10 ms). Further, as discussed in more detail below, for FDD LTE, due to both UL and DL hybrid automatic repeat request (HARD) round trip time (RTT) being 8 ms, the duty cycle should be chosen as a multiple of 8 ms (e.g., N*8 ms).

As mentioned above, LTE defines seven UL/DL frame configurations which are statically configured across all intra frequency cells. Thus, the 3GPP specifications (e.g., the LTE standards) do not have any mechanism for the UE (i.e., the low power device) to inform the network (e.g., eNB 102) of how many TX (UL) sub-frames the UE may be capable of in a TX duty cycle period (e.g., 10 ms). Thus, there are three consequences that may occur due to the UE being unable to inform the network of the UE's TX duty cycle. First, based on a UE pending data buffer status report, the network may assign UL grants in multiple UL TX sub-frames, however, the UE may not be able to transmit in each of the sub-frames assigned by the UL grants due to the TX duty cycle limitation and network radio resources may be wasted when the UE does not transmit in the all assigned UL sub-frames.

Second, since TDD LTE UL/DL frame configurations are asymmetric (each UL sub-frame may have more than one DL sub-frame associated with it for transmission of corresponding ACK/NAKs), DL sub-frame association sets for each UL sub-frame are statically defined per each UL/DL frame configuration as illustrated in FIG. 6B. However, since the UE may not be able to transmit on all TX sub-frames defined in a static UL/DL frame configuration due to TX duty cycle limitation, the ACK/NAKs for DL sub-frames in a DL sub-frame association set for an un-transmitted UL TX sub-frame cannot be transmitted and the network may re-transmit corresponding DL sub-frames. Eventually, this may lead to radio link failure.

Figure 7A:
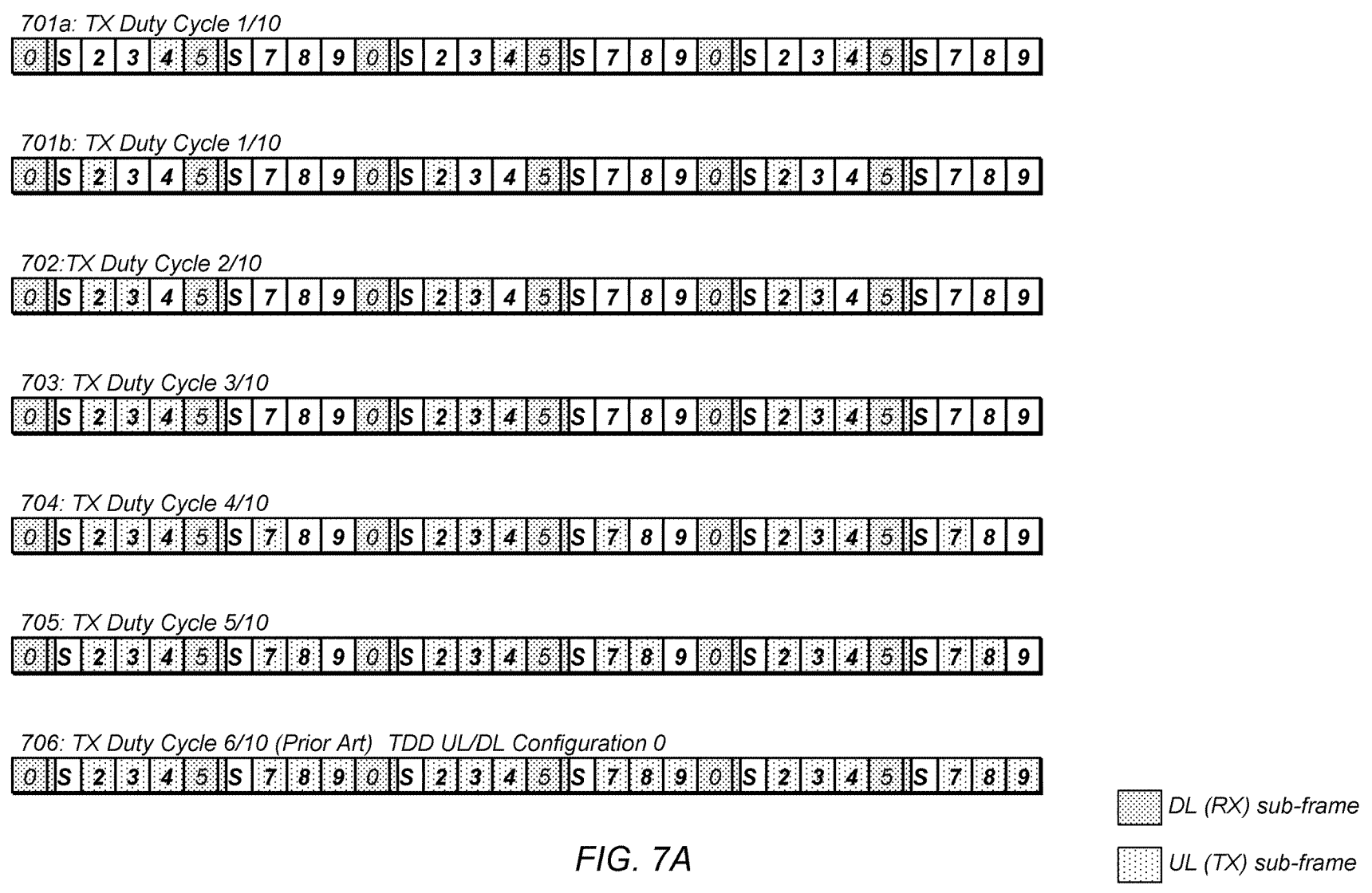

Third, other layer one signals transmitted on UL PUCCH (such as periodic CQI and SRS) cannot be transmitted on assigned sub-frames due to the TX duty cycle. In other words, the UE was assigned an UL sub-frame and the network expects to receive periodic CQI and SRS in that sub-frame, but due to the TX duty cycle, the UE does not transmit in the assigned sub-frame. Such a condition may lead to the network determining to increase BLER (block error rate) unnecessarily which may eventually cause UL radio link failure. Therefore, improvements in the field are desirable As described above in reference to FIG. 6A, there are seven static TDD (time division duplex) UL/DL sub-frame allocations (configurations 0-6). Thus, based on the static configuration of the cell, the low power device (e.g., UE 106) may have up to six TX duty cycles, or power stages (or power states). For example, in some embodiments, as shown in FIG. 7A, the low power device may have six different power stages (states) 701-706 (i.e., may transmit between 1 and 6 times in a frame) for TDD UL/DL configuration 0 described above. The power stages may include a single transmission per frame (701a-b), two transmissions per frame (702), three transmissions per frame (703), four transmissions per frame (704), five transmissions per frame (705), or the prior art (e.g., standards defined for TDD UL/DL configuration 0) six transmissions per frame (706). Note that when the power stage (or TX duty cycle) includes less than six transmissions in a frame (i.e., the standard allocation), the network may allocate which sub-frames the low power device transmits in. For example, as shown at 701a and 701b, when the TX duty cycle is 1 transmission out of 10 sub-frames (1/10), the low power device may be allocated any of sub-frames 2 (701b), 3, 4 (701a), 7, 8, or 9. Signaling methods between the network and the low power device may be used to determine which sub-frames will be allocated for instances when the TX duty cycle is less than the prior art static UL/DL sub-frame allocation are described below in detail.

In some embodiments, TX power may be calculated based on current path loss, network minimum required PUCCH/PUSCH nominal power, and current UL power control command which may be specified in 3GPP specifications. Additionally, when the TX power changes, the low power device may be triggered to enter a different TX power stage (or change TX duty cycle) with an associated maximum number of TX sub-frames. Thus, the low power device may send information (e.g., maximum number of TX sub-frames in a frame) to the network (e.g., eNB 102) via a MAC control element which, in some embodiments, may be included on any UL MAC PDU. In other words, the low power device may request to transmit in less than the statically configured number of sub-frames allocated by the network.

In response to receiving the information (i.e., the request from the low power device to transmit in less than the statically configured number of sub-frames), the network (eNB 102) may allocate sub-frames to the low power device based on the static TDD UL/DL configuration of the cell. For example, as discussed above and illustrated in FIG. 7A, the network may allocate sub-frames to the low power device based on the TX duty cycle (or TX power stage) of the low power device and the static TDD UL/DL configuration for the cell. for example, as shown at 706 of FIG. 7A, if the cell has configuration 0 a standard configuration would be to allocate 6 sub-frames for transmit (UL) (e.g., sub-frames 2, 3, 4, 7, 8, and 9), 2 sub-frames for receive (DL) (e.g., sub-frames 0 and 5) and two transition sub-frames (S) to transition from receive to transmit (e.g., sub-frames 1 and 6 denotes as "S"). However, according to embodiments, if the low power device has a TX duty cycle of 2/10, the network may allocate less than the six sub-frames. For example, as illustrated at 702, the network may allocate sub-frames 2 and 3 to the low power device. Of course, since configuration 0 is defined to allocate 6 sub-frames for transmit as illustrated at 706, the network may assign any combination of the 6 sub-frames to the low power device based on the TX duty cycle. Thus, although sub-frames 2 and 3 are shown allocated, the network may allocate any two of sub-frames 2, 3, 4, 7, 8, and 9 if the low power device has a TX duty cycle of 2/10.

Further allocation examples based on configuration 0 are illustrated at 701a (TX duty cycle of 1/10), 701b (TX duty cycle of 1/10), 703 (TX duty cycle of 3/10), 704 (TX duty cycle of 4/10) and 705 (TX duty cycle of 5/10). Note that the allocations illustrated in FIG. 7A are illustrative only and other allocations based on a particular TX duty cycle are possible. Thus, for a TX duty cycle of 1/10, the network may assign any one sub-frame of sub-frames 2, 3, 4, 7, 8, and 9. Further, for a TX duty cycle of 3/10, the network may assign any three sub-frames of sub-frames 2, 3, 4, 7, 8, and 9. In addition, for a TX duty cycle of 4/10, the network may assign any four sub-frames of sub-frames 2, 3, 4, 7, 8, and 9. Similarly, for a TX duty cycle of 5/10, the network may assign any five sub-frames of sub-frames of sub-frames 2, 3, 4, 7, 8, and 9.

FIGS. 7B-7F further illustrate possible configurations for various combinations of TX duty cycle of the low power device and static TDD UL/DL configurations, according to some embodiments.

Figures 7B, 7C:
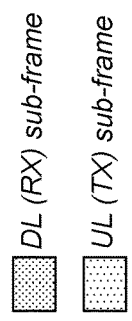
FIG. 7B illustrates TDD sub-frame allocations based on TX duty cycle for TDD UL/DL configuration 1, according to some embodiments.
FIG. 7C illustrates TDD sub-frame allocations based on TX duty cycle for TDD UL/DL configuration 2, according to some embodiments.

Thus, FIG. 7B illustrates possible configurations for various combinations of TX duty cycles of the low power device for static TTD UL/DL configuration 1, according to some embodiments. As illustrated at 804, a standard configuration 1 allocation would allocate 4 sub-frames for transmit (UL) (e.g., sub-frames 2, 3, 7, and 8), 4 sub-frames for receive (DL) (e.g., sub-frames 0, 4, 5, and 9), and two transition sub-frames (e.g., sub-frames 1 and 6 denoted by "S"). Allocation examples based on configuration 1 are illustrated at 801 (TX duty cycle of 1/10), 802 (TX duty cycle of 2/10), and 803 (TX duty cycle of 3/10). Note that the allocations illustrated in FIG. 7B are illustrative only and other allocations based on a particular TX duty cycle are possible. Thus, for a TX duty cycle of 1/10, the network may assign any one sub-frame of sub-frames 2, 3, 7, and 8. Further, for a TX duty cycle of 2/10, the network may assign any two sub-frames of sub-frames 2, 3, 7, and 8. In addition, for a TX duty cycle of 3/10, the network may assign any three sub-frames of sub-frames 2, 3, 7, and 8.

FIG. 7C illustrates possible configurations for various TX duty cycles of the low power device for static TTD UL/DL configuration 2, according to some embodiments. As illustrated at 806, a standard configuration 2 allocation would allocate 2 sub-frames for transmit (UL) (e.g., sub-frames 2 and 7), 6 sub-frames for receive (DL) (e.g., sub-frames 0, 3, 4, 5, 8, and 9), and two transition sub-frames (e.g., sub-frames 1 and 6 denoted by "S"). An allocation example based on configuration 2 is illustrated at 805 (TX duty cycle of 1/10). Note that the allocation illustrated in FIG. 7C is illustrative only and other allocations based on a particular TX duty cycle are possible. Thus, for a TX duty cycle of 1/10, the network may assign any one sub-frame of sub-frames 2 and 7.

Figures 7D, 7E, 7F:
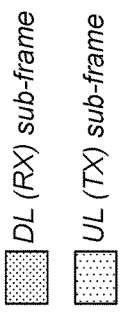
FIG. 7D illustrates TDD sub-frame allocations based on TX duty cycle for TDD UL/DL configuration 3, according to some embodiments.
FIG. 7E illustrates TDD sub-frame allocations based on TX duty cycle for TDD UL/DL configuration 4, according to some embodiments.
FIG. 7F illustrates TDD sub-frame allocations based on TX duty cycle for TDD UL/DL configuration 5, according to prior art.

FIG. 7D illustrates possible configurations for various combinations of TX duty cycles of the low power device for static TTD UL/DL configuration 3, according to some embodiments. As illustrated at 903, a standard configuration 3 allocation would allocate 3 sub-frames for transmit (UL) (e.g., sub-frames 2, 3, and 4), 6 sub-frames for receive (DL) (e.g., sub-frames 0, 5, 6, 7, 8, and 9), and one transition sub-frame (e.g., sub-frame 1 denoted by "S"). Allocation examples based on configuration 3 are illustrated at 901 (TX duty cycle of 1/10) and 902 (TX duty cycle of 2/10). Note that the allocations illustrated in FIG. 7D are illustrative only and other allocations based on a particular TX duty cycle are possible. Thus, for a TX duty cycle of 1/10, the network may assign any one sub-frame of sub-frames 2, 3, and 4. Further, for a TX duty cycle of 2/10, the network may assign any two sub-frames of sub-frames 2, 3, and 4.

FIG. 7E illustrates possible configurations for various TX duty cycles of the low power device for static TTD UL/DL configuration 4, according to some embodiments. As illustrated at 905, a standard configuration 4 allocation would allocate 2 sub-frames for transmit (UL) (e.g., sub-frames 2 and 3), 7 sub-frames for receive (DL) (e.g., sub-frames 0, 3, 4, 5, 6, 7, 8, and 9), and one transition sub-frame (e.g., sub-frames 1 by "S"). An allocation example based on configuration 4 is illustrated at 904 (TX duty cycle of 1/10). Note that the allocation illustrated in FIG. 7E is illustrative only and other allocations based on a particular TX duty cycle are possible. Thus, for a TX duty cycle of 1/10, the network may assign any one sub-frame of sub-frames 2 and 3.

FIG. 7F illustrates a standard configuration 5 allocation in which sub-frame 2 is allocated for transmit (UL), sub-frame 1 is allocated as a transition sub-frame, and sub-frames 2, 3, 4, 5, 6, 7, 8, and 9 are allocated for receive (DL).

Figure 7G:
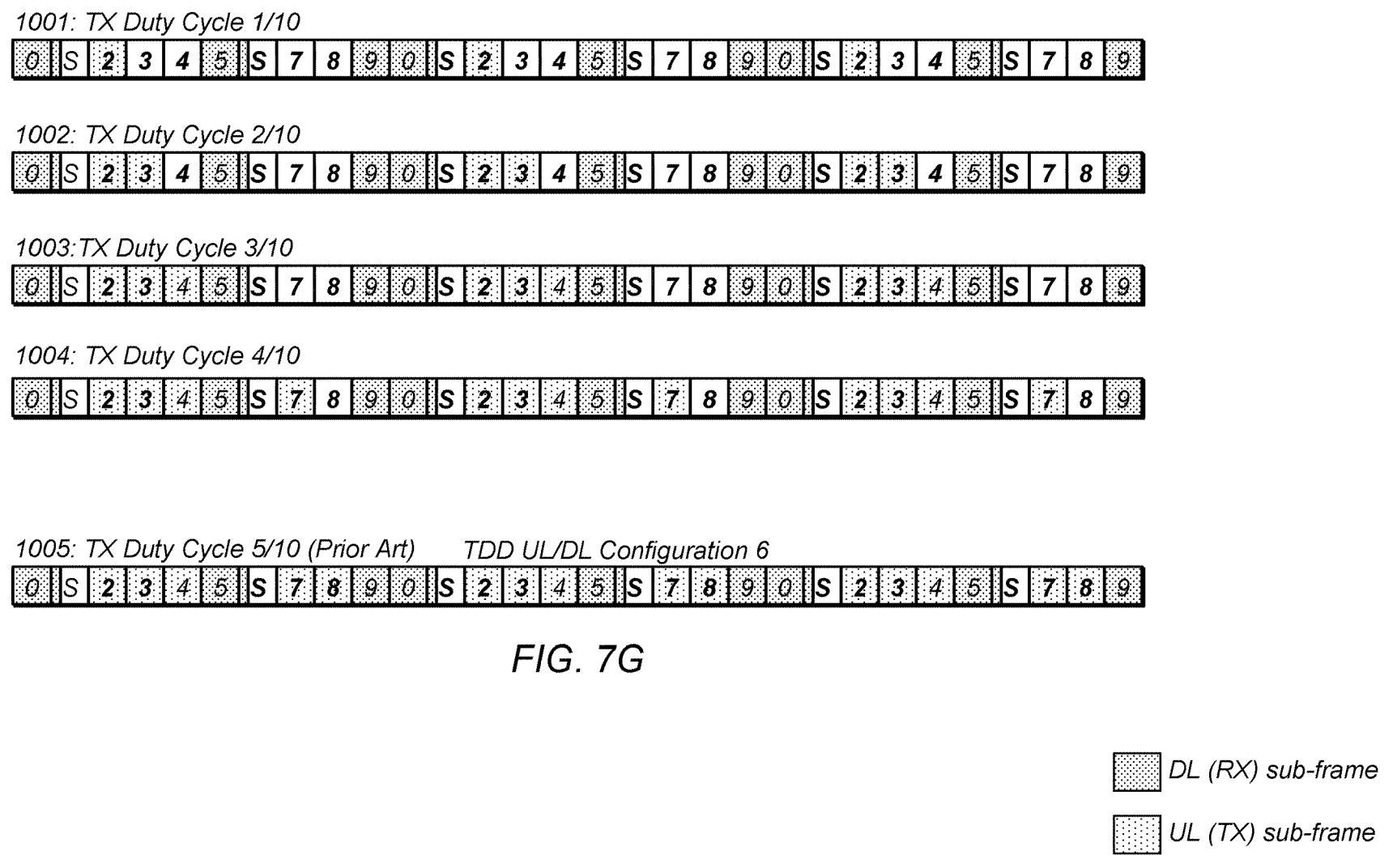

FIG. 7G illustrates possible configurations for various combinations of TX duty cycles of the low power device for static TTD UL/DL configuration 6, according to some embodiments. As illustrated at 1005, a standard configuration 6 allocation would allocate 5 sub-frames for transmit (UL) (e.g., sub-frames 2, 3, 4, 7, and 8), 3 sub-frames for receive (DL) (e.g., sub-frames 0, 5, and 9), and two transition sub-frames (e.g., sub-frames 1 and 6 denoted by "S"). Allocation examples based on configuration 6 are illustrated at 1001 (TX duty cycle of 1/10), 1002 (TX duty cycle of 2/10), 1003 (TX duty cycle of 3/10), and 1004 (TX duty cycle of 4/10). Note that the allocations illustrated in FIG. 7G are illustrative only and other allocations based on a particular TX duty cycle are possible. Thus, for a TX duty cycle of 1/10, the network may assign any one sub-frame of sub-frames 2, 3, 4, 7, and 8. Further, for a TX duty cycle of 2/10, the network may assign any two sub-frames of sub-frames 2, 3, 4, 7, and 8. In addition, for a TX duty cycle of 3/10, the network may assign any three sub-frames of sub-frames 2, 3, 4, 7, and 8. Additionally, for a TX duty cycle of 4/10, the network may assign any four sub-frames of sub-frames 2, 3, 4, 7, and 8.

Note that in some embodiments, the network may send the allocation (e.g., information) based on the TDD UL/DL configuration of the cell and the TX duty cycle of the low power device via a MAC control element which may be included on any DL MAC PDU.

As noted above in reference to FIG. 6B, the PUCCH/PUSCH in an UL sub-frame may carry ACK/NAKs for multiple DL sub-frames which form the DL association set for each assigned UL sub-frame. However, when the low power device requests less than the standard allocated UL sub-frames (e.g., due to a TX duty cycle of less than the standard allocation), the DL association set for each allocated UL sub-frame may be different from the allocation set for each TDD UL/DL configuration defined in the 3GPP LTE specification. For example, if an UL sub-frame that would have been allocated based on the defined static TDD UL/DL configuration but is not due to the low power device's TX duty cycle, the unassigned UL sub-frame's downlink association set may be merged to the next closest allocated UL sub-frame's downlink association set. As an example, if the TDD UL/DL configuration is configuration 0 (standard allocation of 6 UL sub-frames and 2 DL sub-frames as DSUUUDSUUU) and the low power device has a TX duty cycle of 4/10, then the network may allocate sub-frames 4, 7, 8, and 9 and not allocate sub-frames 2 and 3 (modified allocation of 4 UL sub-frames and 2 DL sub-frames as DSxxUDSUUU). Since sub-frames 2 and 3 are not allocated, then sub-frame 2 and 3's downlink association sets (6 for sub-frame 2, none for sub-frame 3) may be merged to sub-frame 4's, which becomes {6, 4}. As another example, if the static TDD UL/DL configuration is configuration 1 (standard allocation of 4 UL sub-frames and 4 DL sub-frames as DSUUDDSUUD) and the low power device has a TX duty cycle of 3/10, then the network may allocate sub-frames 3, 7, and 8 and not allocate sub-frame 2 (modified allocation of 3 UL sub-frames and 4 DL sub-frames as DSxUDDSUUD). Since sub-frame 2 is not allocated, then sub-frame 2's downlink association set {7, 6} may be merged to sub-frame 3's, which becomes {7, 6, 4}.

In some embodiments, a downlink assignment index (DAI) in PDCCH DCIx and DCI0 (downlink control information formats) may be based on above merged downlink association set instead of as defined in the 3GPP standard. Thus, the DAI in DCI0 may represent the total number of DL sub-frames to be ACK/NAK in a merged downlink association set and the DAI in DCIx may represent the cumulative number of DL sub-frames to be ACK/NAK in the merged downlink association set.

Note that even though there are a maximum of 6 possible TX power stages (or TX duty cycles) for the low power device, the transitions between different power stages may not be necessary to trigger above mentioned message to network for a new UL sub-frame allocation. For example, in some embodiments, to avoid excessive messaging between the low power device and the network, the low power device may remain with less possible number of TX sub-frames in an allocation with higher TX power. In other words, if the low power device originally requested an allocation based on a TX duty cycle of x/10, the low power device may not request a new allocation based on a new duty cycle of y/10 (y greater than x) to avoid excessive messaging.

In some embodiments, the network may not change UL allocation to a number of allocated TX sub-frames more than a previous allocation without the low power device's request. However, the network may change UL allocation with less or equal number of allocated TX sub-frames than a previous allocation without the low power device's request. In other words, if the low power device has a TX duty cycle of x/10, the network may vary the allocation so long as the low power device is not required to transmit more than x/10 sub-frames. This may allow the network scheduler to move the low power device's allocation within the frame to optimize available UL sub-frames for other UEs. Additionally, the network scheduler may downgrade the allocation due to detected higher UL BLER or other channel condition measures.

Dynamic Switch Between UL Sub-Frame Allocations in TDD-LTE

As mentioned above (and illustrated in FIG. 6A), there are 7 TDD static UL/DL frame configurations which are statically configured across all intra frequency cells. Additionally, based on the statically configured TDD UL/DL frame configuration and the low power device's requested TX duty cycle (number of TX sub-frames in a frame), each TDD UL/DL configuration may have multiple possible UL sub-frame allocations. For example, TDD UL/DL configuration 1 (standard allocation of 4 UL sub-frames and 4 DL sub-frames as DSUUDDSUUD) has 4 available UL sub-frame allocations for a TX duty cycle of 1/10 (DSUxDDSxxD, DSxUDDSxxD, DSxxDDSUxD, and DSxxDDSxUD). In other words, since TDD UL/DL configuration 1 is defined to have 4 UL sub-frames, the network may assign any of the 4 available UL sub-frames to a low power device requesting 1 UL sub-frame per frame. Further, if the TX duty cycle is 2/10, there are 6 available UL sub-frame allocations (DSUUDDSxxD, DSUxDD SUxD, DSUxDD SxUD, DSxUDD SUxD, DSxUDD SxUD, and DSxxDDSUUD). Thus, in addition to the above described low power device request for sub-frame allocation base on TX duty cycle, improvements in signaling to allow for dynamic switching between UL sub-frame allocations based on current UL/DL configuration and TX duty cycle are desirable.

Thus, in some embodiments, the low power device (i.e., UE 106) may inform the network (i.e., eNB 102) of its currently supported TX duty cycle (i.e., the number of UL sub-frames the low power device is currently capable of transmitting in a frame) via a MAC control element as described above. In addition, in some embodiments, the MAC control element may be 8 bits long to indicate the number of requested UL sub-frames in a frame and the UL sub-frame allocation from the TDD UL/DL static configuration may be considered the initial UL sub-frame configuration. Thus, any further UL sub-frame allocation or de-allocation from the network (e.g., in response to the low power device's request) may be an update to the initial (or existing) UL sub-frame allocation. For example, a new UL sub-frame allocation may add several UL sub-frames in a frame as newly allocated and delete several UL sub-frames in a frame as newly de-allocated.

In some embodiments, to update an UL sub-frame as newly de-allocated (i.e., deleted or removed), the network may use a DCI0 format in a DL PDCCH sub-frame. Note that DCI0 format may be normally used for the scheduling of corresponding UL PUSCH sub-frames. In such embodiments, the DCI0 format may be used to also indicate if the corresponding UL sub-frame is de-allocated. Further, if the MAC PDU transmitted in a previous hybrid automatic repeat request (HARD) transmission cycle is acknowledged, then 2 bits may be used: 1 bit for a de-allocation indictor and 1 bit for the ACK/NAK. Note that DCI0 includes the following information:

1. Flag for format0/format1A differentiation (1 bit).
2. Frequency hopping fag (1 bit).
3. Resource block assignment and hopping resource allocation ([log(N*(N+1)/2] bits).
4. Modulation and coding scheme and redundancy version (5 bits).
5. New data indicator (1 bit).
6. TPC command for scheduled PUSCH (2 bits).
7. Cyclic shift for DM RS (3 bits).
8. UL index (2 bits).
9. Downlink Assignment Index (2 bits).
10. CQI request (1 bit).

In some embodiments, the 2 bits for the de-allocation indicator and the ACK/NAK may be re-used from the bits from #2, #3, #4, #5, #6 and #7 of DCI0.

Note that after the PDCCH sub-frame with the specific DCI0 format (i.e., indicating the de-allocation of the UL sub-frame) is sent to the low power device, the network may expect an ACK from the low power device on the corresponding UL sub-frame for the sent DCI0 on the PUCCH. In addition, when the DCI0 format specifies the de-allocation of the UL sub-frame, the ACK/NAKs for the DL sub-frames in the to be de-allocated UL sub-frame's DL association set may be received by the network (and sent by the low power device) on the next closest active UL sub-frame as described above. In addition, once the network receives the ACK from the low power device on the corresponding UL sub-frame for the sent DCI0 on the PUCCH, the network may determine that allocation (i.e., the de-allocation of the UL sub-frame) is complete and further determine that the de-allocated UL sub-frame's downlink association set has been merged to a next closest active UL sub-frame's downlink association set by the low power device. Note that the HARQ process associated with the de-allocated UL sub-frame may also be disabled. However, if no ACK is detected, the network may determine that the allocation (i.e., the de-allocation of the UL sub-frame) has not been completed and may transmit the specific DCI0 format on the same PDCCH sub-frame in a next allocation period (i.e., same sub-frame on next frame).

Additionally, to add an UL sub-frame in a frame as newly allocated, the network may also use a DCI0 format in a DL PDCCH sub-frame which normally is used for the scheduling of corresponding UL PUSCH sub-frame to implicitly indicate the corresponding UL sub-frame is allocated for further UL transmission which includes both PUSCH and PUCCH. Note that, if there is no PUSCH scheduling (i.e., only UL sub-frame allocation), the above DCI0 format's bits from #2, 3, 4, 5, 6, and 7 may be re-used for a one bit indicator of the UL sub-frame allocation. Note further that if a normal DCI0 in PDCCH is sent to the low power device for the to be allocated UL sub-frame and the network receives (and the low power device sends) PUSCH on the corresponding UL sub-frame, the network may determine that the adding of the UL sub-frame to the existing UL sub-frame allocation has been completed. Also, if the network receives (and the low power device sends) PUCCH with an ACK on the corresponding UL sub-frame, the network may determine that the adding of the UL sub-frame to the existing UL sub-frame allocation has been completed.

Once the allocation of the UL sub-frame has been completed (i.e., the newly added allocation has been added to the existing UL sub-frame allocation), then the newly allocated UL sub-frame's downlink association set may be established by the low power device. Thus, the content of the newly allocated UL sub-frame's downlink association set may be removed from the next closest allocated UL sub-frame's downlink association set and the network may establish a HARQ process associated with the newly allocated UL sub-frame.

Note that if neither the PUSCH nor the ACK on the PUCCH has been received by the network (or sent by the low power device) on the to be allocated UL sub-frame, then the network may repeat the above described procedure for adding the UL sub-frame in a frame as newly allocated in the next allocation period (i.e., the next frame).

Further, when the low power device receives the DCI0 format in the PDCCH sub-frame as described above, it may take any of the following actions:

If the DCI0 format indicates that the corresponding UL sub-frame is to be de-allocated, the low power device may disable the HARQ process corresponding to the to be de-allocated UL sub-frame. Additionally, if the specific DCI0 format indicates that the corresponding HARQ process is acknowledged, then the low power device may mark the corresponding radio link control (RLC) PDUs in the acknowledged MAC PDU as acknowledged. If the specific DCI0 format indicates that the corresponding HARQ process is not acknowledged, then the low power device may mark the corresponding RLC PDUs in the not acknowledged MAC PUD as not acknowledged and may further schedule them to be transmitted using other active UL HARQ processes. Additionally, the low power device may transmit an ACK for the received PDCCH sub-frame with the DCI0 format on the corresponding to be de-allocated UL sub-frame in order to inform the network that the removing of the to be de-allocated UL sub-frame has been completed. Note that the received PDCCH sub-frame may be part of the to be de-allocated UL sub-frame's downlink association set, of which all downlink PDSCH sub-frames received may be ACK/NAK in the next closest allocated UL sub-frame, along with all DL PDSCH sub-frames received in the downlink association set of the next closest allocated UL sub-frame.

If the DCI0 format indicates that the corresponding UL sub-frame is to be allocated (added, re-allocated, or newly allocated), then the low power device may associate an un-used (disabled) UL HARQ process with the to be allocated UL sub-frame and add it to the current set of active UL HARQ processes. Additionally, if it is a standard DCI0 format, then PUSCH with UL data may be sent by the low power device to the network (i.e., eNB 102) on the to be allocated (i.e., newly activated) UL sub-frame which may implicitly indicate the procedure of allocating the to be allocated UL sub-frame into the existing sub-frame allocation has been completed. Otherwise, if it is a specific DCI0 format, then PUCCH with ACK may be sent by the low power device to the network (eNB 102) on the to be allocated (i.e., newly activated) UL sub-frame to complete the procedure of adding the to be allocated UL sub-frame into the existing sub-frame allocation. Further, the low power device may establish a DL association set for the to be allocated (newly activated) UL sub-frame and remove any DL sub-frames included in the established DL association set from the next closest allocated UL sub-frame's DL association set.

UL/DL Sub-Frame Allocation in FDD Low Power LTE

Similar to the issues described above with respect to TDD, there are issues with respect to a low power device using a TX duty cycle as described above for frequency division duplex (FDD) LTE. First, as defined in the current LTE 3GPP specification (i.e., Rel-8 through Rel-12), FDD LTE UL and DL HARQ have a round trip time (RTT) of 8 ms. Thus, the use of a TX duty cycle as described above may violate this timeline. Additionally, the current LTE 3GPP specifications for FDD LTE do not define a mechanism for the low power device (i.e., UE 106) to inform the network (i.e., eNB 102) of how many TX sub-frames the low power device may be capable of in a duty cycle period (i.e., how many sub-frames the low power device may be able to transmit in during an 8 ms RTT). There may be three consequences to not having such a mechanism: (1) based on the low power device's pending data buffer status report, the network may assign UL grants in multiple UL TX sub-frames, but the low power device may not be able to transmit in all UL sub-frames granted (allocated by the network) due to the TX duty cycle limitation which may lead to wasted network radio resources; (2) in FDD LTE, for any DL PUSCH sub-frame, the low power device must transmit its ACK/NAK on UL PUCCH/PUSCH sub-frame 4 ms later, however, since the low power device may not be able to transmit on all TX sub-frames allocated by the network due to the TX duty cycle limitation, the ACK/NAKs for received DL sub-frames on an un-transmitted UL TX sub-frame may not be transmitted which may cause the network to re-transmit corresponding DL sub-frames which may result in radio link failure; (3) other layer one signals transmitted on UL PUCCH such as periodic CQI and SRS may not be transmitted on un-transmitted UL TX sub-frames due to the TX duty cycle limitation which could falsely lead the network to increase BLER and may also result in UL radio link failure. Therefore, improvements are desirable.

In LTE FDD, there are 8 UL sub-frames in an allocation period, thus, there are eight possible TX power stages, each associated with a number of TX sub-frames the low power device may be capable of transmitting in the 8 ms allocation period based on currently required TX power. The currently required TX power may be calculated based on current path loss, network minimum required PUCCH/PUSCH nominal power, and current UL power control command (specified in current LTE 3GPP specifications). Note that changing currently required TX power may trigger the low power device to enter a different TX power stage with an associated maximum number of TX sub-frames. Thus, in some embodiments, the low power device may send this information (number of capable TX sub-frames in an allocation period) to the network via a MAC control element. The MAC control element may be piggybacked on any UL MAC PDU.

Similar to the TDD scenarios described above, the network may receive the maximum number of TX sub-frames request from the low power device. In some embodiments, the network may restrict UL sub-frames allocated to the low power device based on the request. The network may have four options for the UL sub-frame allocation restrictions. First, in some embodiments, if the low power device has indicated to the network (e.g., via an LTE capability indication message) that the low power device supports half-duplex for the band the low power device has camped on, then out of the 8 sub-frames in the allocation period, N may be for UL and 8-N may be for DL. In such instances (e.g., half-duplex mode), sub-frame allocation may be performed dynamically by the network (e.g., eNB 102) via the network scheduler as mentioned in LTE 3GPP Rel-8 half-duplex LTE.

In such embodiments, the low power device may be able to transmit at any time per network schedule. Thus, the low power device, based on the network schedule, may be required to transmit UL PUSCH sub-frame based on DCI0 UL grant received in a DL PDCCH sub-frame 4 ms earlier and transmit DL ACK/NAK on a UL PDCCH/PUSCH sub-frame for a PDSCH sub-frame received 4 ms earlier. Note that the low power device may receive DL sub-frames unless the low power device is performing a transmission.

Alternatively, the allocation may be performed semi-statically by the network scheduler by assigning sub-frame allocations to the low power device via a sub-frame allocation configuration message in response to receiving the maximum number of TX sub-frames request from the low power device. The network may send the sub-frame allocation information to the low power device via a MAC control element which may be piggybacked on any DL MAC PDU.

Second, in some embodiments, if the low power device supports full duplex on the band it is camped on, then there are 8 DL sub-frames for DL reception in the allocation period and N UL sub-frames out of 8 may be assigned by the network for UL transmission. In some embodiments, the network (i.e., eNB 102) may assign a sub-frame allocation to the low power device via a sub-frame allocation configuration message in response to receiving the maximum number of TX sub-frames request from low power device. The network may send the sub-frame allocation configuration message to the low power device via a MAC control element which, similar to the above, may be piggybacked on any DL MAC PDU.

Third, in some embodiments, whether the low power device supports only half duplex or both full and half duplex on the band it is camped on, control signaling may be used by the network to assign a sub-frame allocation to the low power device. Thus, in some embodiments, PUCCH/PUSCH in a UL sub-frame may carry ACK/NAKs for multiple DL sub-frames which form a DL association set for each assigned UL sub-frame. Note that as defined in the LTE 3GPP specifications, without any UL restriction, each UL sub-frame's DL association set includes one DL sub-frame which is received at sub-frame (n–4), where n is the UL sub-frame. Thus, if an UL sub-frame is not allocated, the un-allocated UL sub-frame's downlink association set may be merged to a next closest allocated UL sub-frame's downlink association set. In other words, similar to TDD, the ACK/NAKs for multiple DL sub-frames are sent by the low power device in the allocated sub-frame. Hence, a downlink assignment index (DAI) may be introduced to FDD PDCCH DCIx and DCI0 from TDD, and may be based on above described merged downlink association set.

Fourth, in some embodiments, full duplex UEs (including low power devices) and half duplex UEs (including low power devices) may co-exist in a FDD cell. A time for downlink-to-uplink switch may be created at the low power device (i.e., UE 106) by ignoring the last OFDM symbol(s) in a sub-frame immediately preceding an UL sub-frame. Additionally, a time for uplink-to-downlink switch may be created by a timing advance such as (Nta+Nta_offset)Ts seconds, where Nta_offset=624 Ts=20 us.

Figure 8:
FIG. 8 illustrates symmetric FDD sub-frames allocations based on TX duty cycle, according to some embodiments.

In some embodiments, a default dynamic symmetric UL/DL sub-frame allocation may be created as part of the network schedule (e.g., via the scheduler of eNB 102). Examples of such FDD symmetric UL/DL sub-frame allocations are illustrated in FIG. 8, according to some embodiments. For example, a FDD symmetric UL/DL sub-frame allocation for a TX duty cycle of 1/8 is illustrated at 1101, according to some embodiments. 1102*a-c* illustrate various FDD symmetric UL/DL sub-frame allocations for a TX duty cycle of 2/8, according to some embodiments. 1103*a-c* illustrate various FDD symmetric UL/DL sub-frame allocations for a TX duty cycle of 3/8, according to some embodiments. Additionally, 1104 illustrates a prior art FDD symmetric UL/DL sub-frame allocation for a TX duty cycle of 4/8.

In such embodiments, control signaling (transmission and ACK/NAK of transmission) between the low power device and the network may be performed at fixed time intervals (e.g., such as 4 ms). Additionally, a change in the low power device's TX duty cycle configuration may be triggered by a low power device event (e.g., an increase or decrease in required TX power) and the low power device may send an UL MAC control element embedded in any UL MAC PDU indicating a new number of sub-frames the low power device may be currently capable of transmitting in an allocation period. Note that since the FDD UL/DL allocation is symmetric, a TX duty cycle of 1/8 means that the low power device may only transmit in 1 UL and receive in 1 DL sub-frame. Thus, such a configuration may not be able to utilize all available radio resources in DL heavy use cases and UL heavy use cases.

Figures 9D, 9E:
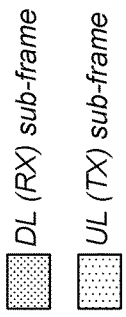
FIG. 9D illustrates HD FDD sub-frame allocations based on TX duty cycle for HD FDD UL/DL configuration 3, according to some embodiments.
FIG. 9E illustrates HD FDD sub-frame allocations based on TX duty cycle for HD FDD UL/DL configuration 4, according to some embodiments.

In some embodiments, a semi-static, non-symmetric FDD UL/DL sub-frame allocation scheme may be utilized as illustrated in FIGS. 9A-9E. For example, FIG. 9A illustrates a half duplex (HD) FDD UL/DL allocation for HD FDD UL/DL allocation configuration 0 at 1201, according to some embodiments. FIG. 9B illustrates HD FDD UL/DL allocations for HD FDD UL/DL configuration 1 at 1202a, 1202b, and 1202c, according to some embodiments. FIG. 9C illustrates HD FDD UL/DL allocations for HD FDD UL/DL configuration 2 at 1203a, 1203b, and 1203c, according to some embodiments. FIG. 9D illustrates HD FDD UL/DL allocations for HD FDD UL/DL configuration 3 at 1301a and 1301b, according to some embodiments. FIG. 9E illustrates HD FDD UL/DL allocations for HD FDD UL/DL configuration 4 at 1302a, 1302b, and 1302c, according to some embodiments.

Note that similar to the symmetric FDD UL/DL allocation, a change in the low power device's TX duty cycle configuration may be triggered by a low power device event (e.g., an increase or decrease in required TX power) and the low power device may send an UL MAC control element embedded in any UL MAC PDU indicating a new number of sub-frames the low power device may be currently capable of transmitting in an allocation period. In such embodiments, the number of DL to UL switches may be minimized and there may not be a need to have fixed DL sub-frames 0 and 5 for all UEs (including the low power device). Further, the control signaling may be similar to the control signaling method described above in reference to TDD. Thus, PUCCH/PUSCH in an UL sub-frame may include ACK/NAKs for multiple DL sub-frames. Additionally, there may be multiple ACK/NAK feedback modes: bundling and multiplexing.

Figure 10:
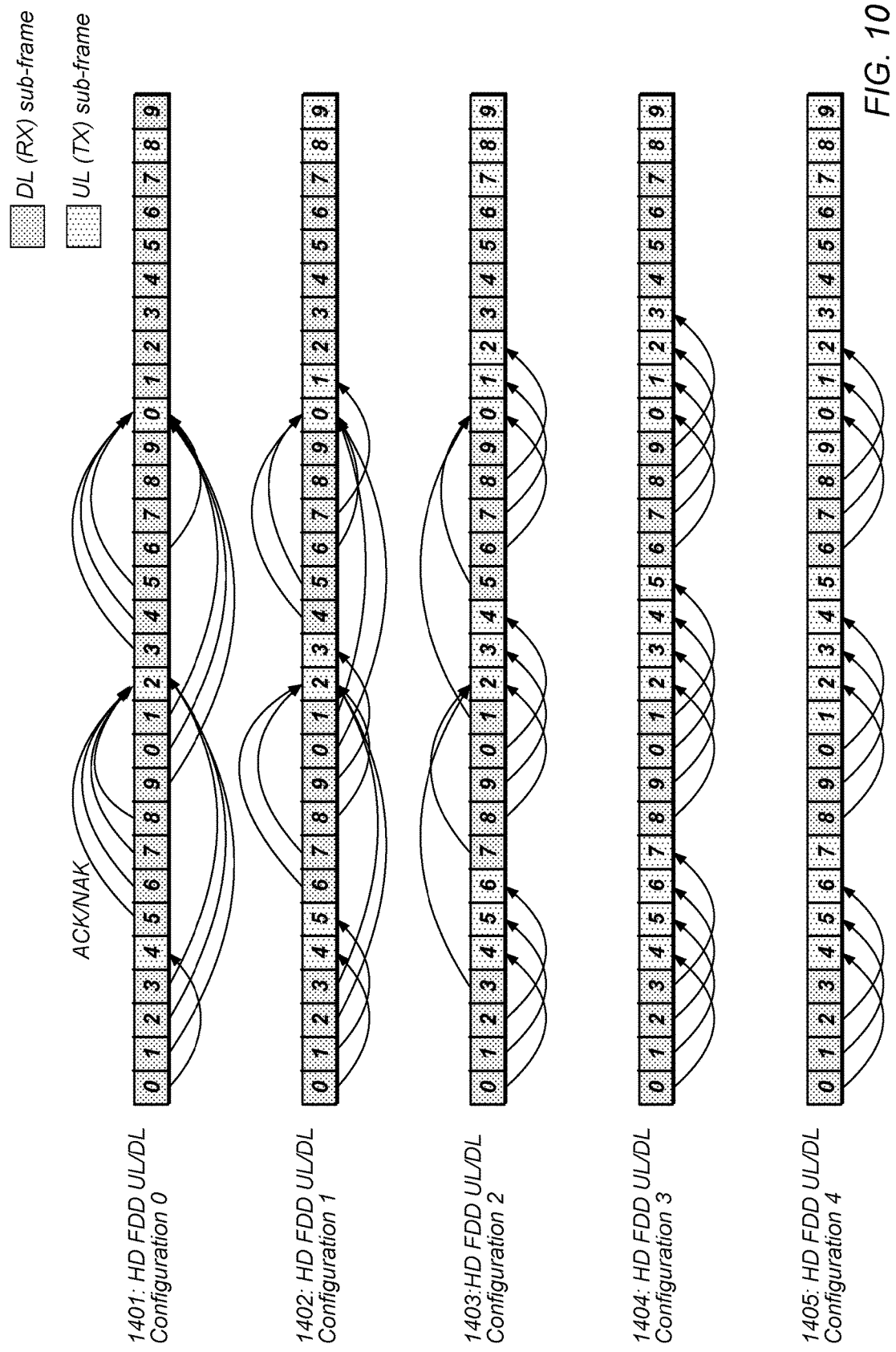
FIG. 10 illustrates ACK/NACK bundling for various HD FDD sub-frame allocations, according to some embodiments.

Further, according to some embodiments, PHICHs in DL sub-frames may carry ACK/NAKs for multiple UL sub-frames as illustrated in FIG. 10. For example, 1401 illustrates ACK/NAK bundling for HD FDD UL/DL configuration 0. As illustrated at 1401, since the low power device only transmits every eighth sub-frame (i.e., has a TX duty cycle of 1/8), ACK/NAKs from prior frames may be transmitted in a next frame. Thus, when the low power device transmits at sub-frame 2, ACK/NAKs from sub-frames 1, 2, 3, 5, 6, 7, and 8 of the prior frame may be sent. Similarly, when the lower power device next transmits at sub-frame 0, ACK/NAKs from sub-frames 9, 0, 1, 3, 4, 5, and 6 of prior frames may be sent. 1402 illustrates ACK/NAK bundling for HD FDD UL/DL configuration 1 and 1403 illustrates ACK/NAK bundling for HD FDD UL/DL configuration 2. In addition, 1404 illustrates ACK/NAK bundling for FDD UL/DL configuration 3 and 1405 illustrates ACK/NAK bundling for FDD UL/DL configuration 4.

Note that in some embodiments, DCI fields in PDCCH may be related to the FDD UL/DL allocation. For example, an UL index may include at least two bits for specifying UL UL/DL timing relationships for power control, CQI reporting, and HARQ transmissions. A downlink assignment index (DAI) may include at least two bits and may include information such as a number of PDSCHs in a downlink association set and may allow the low power device to detect missing PDSCH and PDCCH sub-frames.

Figure 11:
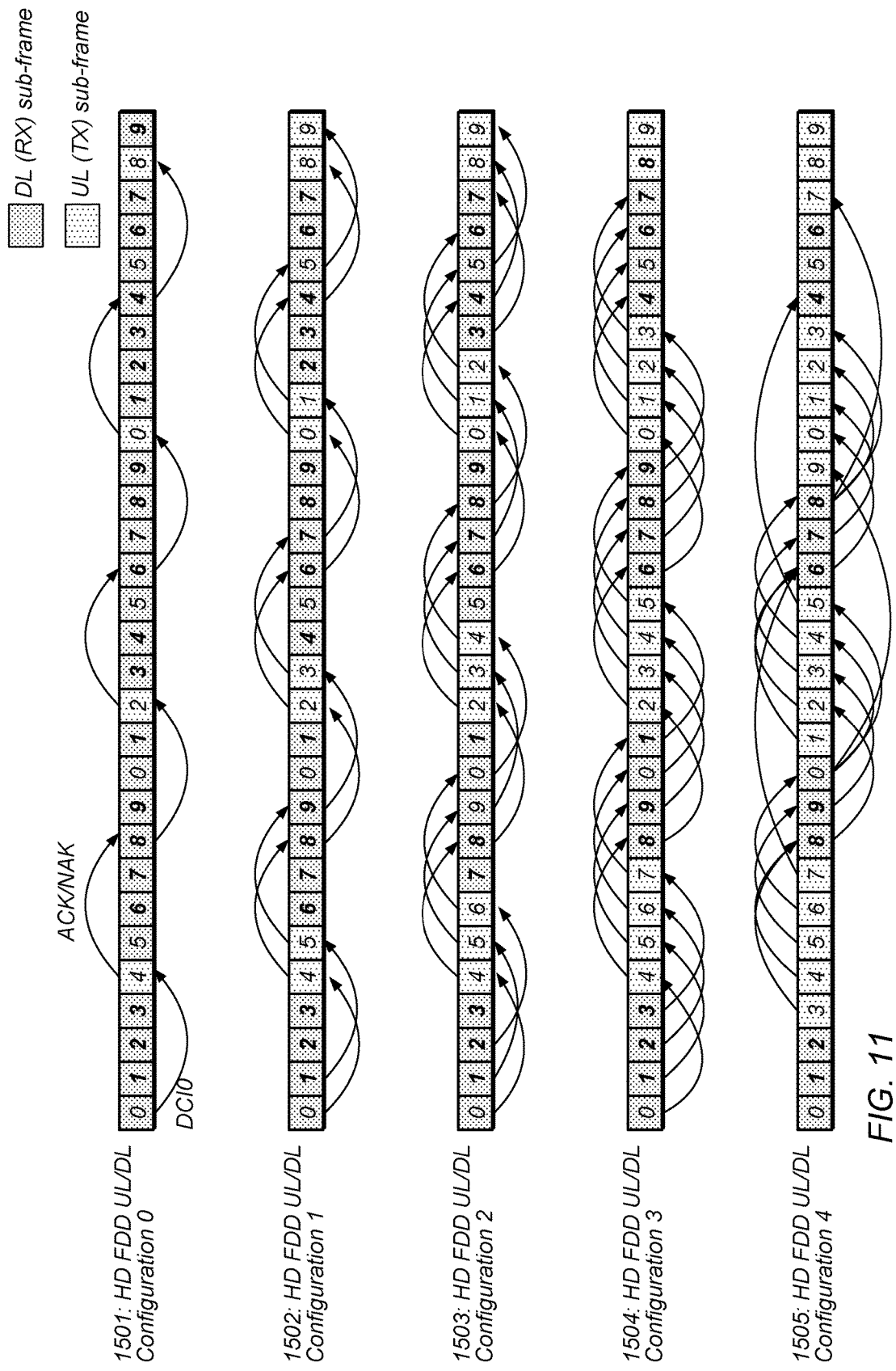
FIG. 11 illustrates relationships between UL and DL sub-frames for receiving ACK/NAKs and UL grants on DL for UL PUSCH for various HD FDD UL/DL configurations, according to some embodiments.

FIG. 11 illustrates relationships between UL and DL sub-frames for receiving ACK/NAKs and UL grants on DL for UL PUSCH for various HD FDD UL/DL configurations, according to some embodiments. 1501 illustrates an example relationship between UL and DL sub-frames for receiving ACK/NAKs and UL grants of DL for UL PUSCH for HD FDD UL/DL configuration 0. 1502 illustrates an example relationship between UL and DL sub-frames for receiving ACK/NAKs and UL grants of DL for UL PUSCH for HD FDD UL/DL configuration 1. 1503 illustrates an example relationship between UL and DL sub-frames for receiving ACK/NAKs and UL grants of DL for UL PUSCH for HD FDD UL/DL configuration 2. 1504 illustrates an example relationship between UL and DL sub-frames for receiving ACK/NAKs and UL grants of DL for UL PUSCH for HD FDD UL/DL configuration 3. 1505 illustrates an example relationship between UL and DL sub-frames for receiving ACK/NAKs and UL grants of DL for UL PUSCH for HD FDD UL/DL configuration 4.

Note that in some embodiments DAI in DCI0 may represent the total number of DL sub-frames to be ACK/NAK in the merged downlink association set. In addition, note that DAI in DCIx may represent the cumulative number of DL sub-frames to be ACK/NAK in a merged downlink association set.

Further, in some embodiments, the low power device's transition between different power stages may not always trigger the low power device to send a message to the network for a new UL sub-frame allocation. Thus, in order to avoid excessive messaging between the low power device and the network, the low power device may stay with less than the maximum possible number of TX sub-frames in an allocation with higher TX power. Additionally, the network may not change the UL allocation to an allocation greater than a current (i.e., previous) allocation unless the low power device requests a new allocation with a greater number of TX sub-frames. However, the network may change the UL allocation to an allocation with less TX sub-frames than a previous (i.e., current) allocation without the low power device requesting a new allocation with a lesser number of TX sub-frames. Thus, for example, if the network scheduler determines that the low power device's allocation should be changed (either keeping the same number or UL sub-frames and changing which frames the low power device may use or reducing the number of UL sub-frames allocated to the low power device) in order to better use (e.g., optimize) network resources, then the allocation may be changed without the request of the low power device. Additionally, the network may downgrade (e.g., reduce the number of UL sub-frames allocated to the low power device) if the network detects an change in BLER or other channel quality indicator that may indicate deteriorating channel conditions that may result in increased TX power for successful transmission.

Generic Mechanism for Dynamic Switch Between FDD/TDD LTE Sub-Frame Allocations

As mentioned above, for frequency division duplex (FDD) LTE, the UL and DL HARQ RTT is defined to be 8 ms. Additionally half duplex FDD may be preferred to remove the RF duplexer (e.g., to further conserve power of the low power device) in the RF front end of a low power device (i.e., UE 106) and to improve RF sensitivity. Thus, the TX duty cycle period for FDD LTE should be chosen as a multiple of the RTT (i.e., N*8 ms). Additionally, in half duplex FDD LTE, there are many possible sub-frame allocations in one 8 ms allocation period (frame) defined in the 3GPP LTE standards. For example, possible sub-frame allocations include DDUUDDUU, or DDDDUDDD, etc. Thus, improvements in the field to be able to dynamically switch between these UL sub-frame allocations are desirable.

Figure 12:
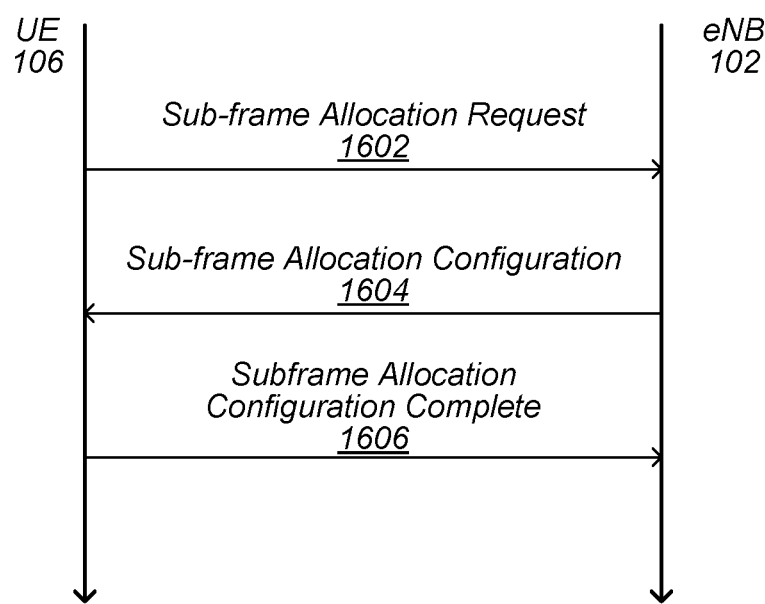
FIG. 12 illustrates a signaling between a low power device and a base station for dynamically switching between UL sub-frame allocations according to some embodiments.

FIG. 12 illustrates a method for signaling between a low power device and a base station for dynamically switching between UL sub-frame allocations according to some embodiments. The method shown in FIG. 12 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. As shown, the method may be performed as follows.

As shown, a dynamic switch between sub-frame allocations may be performed via a 3-step handshaking procedure between a low power device (i.e., UE 106) and the network (i.e., eNB 102). The dynamic switch may be triggered at 1602 via a sub-frame allocation request message from the UE to the eNB. The sub-frame allocation request message may be a one bit MAC control element embedded in any UL MAC PDU. The MAC control element may indicate to the eNB a number of TX sub-frames UE may be currently capable to transmit in an allocation period. Note that for FDD, the allocation period may be 8 ms, and the start sub-frame of an allocation period may be on any sub-frame whereas for TDD, the allocation period may be 10 ms and the allocation period may be aligned with one frame. In some embodiments, the UE may suspend lower priority UL data (non time-sensitive data) to ensure that all UL HARQ processes which handle lower priority UL data will not transmit new data. In other words, to conserve transmission power, the UE may suspend non time-sensitive data and reduce UL HARQ processes which handle lower priority UL data to only transmit re-transmissions of lower priority data. Additionally, this allows the UE to ensure that higher priority data (e.g., time-sensitive data such as voice over LTE) is transmitted.

In response to the sub-frame allocation request message, the eNB may send a MAC control element sub-frame allocation configuration message to the UE at 1604. The MAC control element sub-frame allocation configuration message may be embedded in a DL MAC PDU. The MAC control element sub-frame allocation configuration may indicate to the UE which TX sub-frames in an allocation period are assigned to the UE and which RX sub-frames in the same allocation period are assigned to UE. In some embodiments, the eNB may suspend lower priority DL data. Note that the DL lower priority data may be suspended to ensure that all DL HARQ processes associated with the lower DL lower priority data will not transmit new data. In other words, the suspension ensures that only previously transmitted lower priority data is re-transmitted and no new lower priority data is transmitted.

In some embodiments, the MAC control element sub-frame allocation configuration may include a start system frame number (SFN) for the allocation period, a bitmap indicating HARQ ACK/NAK status for all current UL HARQ processes in eNB (1 indicates HARQ ACK, 0 indicates HARQ NAK), and a bitmap indicating which TX sub-frames in the allocation period are allocated to the UE. Note that since the UL HARQ is synchronized, the HARQ process corresponding to the 1st bit in the bitmap may be mapped to the first TX sub-frame in the existing allocation period and the SFN of the first TX sub-frame may be calculated from the start SFN of the allocation period. Note further that FDD, the bitmap indicating which TX sub-frames in the allocation period are allocated to the UE may be 8 bits. The bitmap may include 1s to indicate which TX sub-frames are allocated to the UE in the allocation period and 0s to indicate which RX sub-frames are allocated to the UE in the allocation period. Additionally, for TDD, since the allocation period is aligned with the 10 ms TDD frame, the bit map may indicate which TX sub-frames in current TDD UL/DL configuration are allocated to UE.

In response to receiving the sub-frame allocation configuration, the UE may update the status of currently pending acknowledged MAC UL PDUs based on the received UL HARQ process status bitmap, apply the sub-frame allocation configuration on a next allocation period, and resume lower priority UL data.

At 1606, the UE may send a MAC control element allocation configuration complete message to the eNB. The message may be embedded in any UL MAC PDU to the eNB. The MAC control element may include a bitmap indicating HARQ ACK/NAK status for all current DL HARQ processes. In response to receiving the allocation configuration complete message from the UE, the eNB may update currently pending acknowledged MAC DL PDUs status and may apply the newly assigned sub-frame allocation configuration on the next allocation period and resume lower priority DL data.

FIGS. 13A-14B: Methods for Sub-Frame Allocation

Figure 13A:
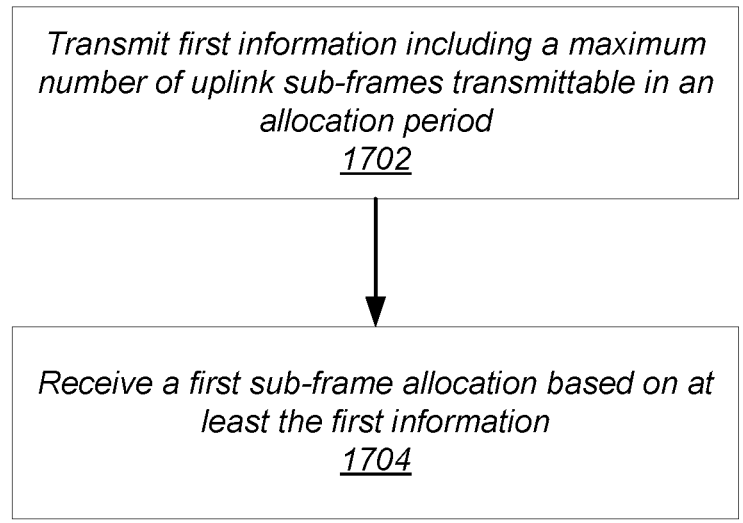
FIG. 13A illustrates a method for a user equipment device (UE) to request a sub-frame allocation, according to some embodiments.

FIG. 13A illustrates a method for a user equipment device (UE) to request a sub-frame allocation, according to some embodiments. The method shown in FIG. 13A may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1702, a UE, such as UE 106, may transmit (e.g., via radio 330), first information to a base station, such as base station 102. The first information may include a maximum number of uplink (UL) sub-frames the UE can transmit in an allocation period. In some embodiments, the first information may be transmitted via a sub-frame allocation request message. In addition, the sub-frame allocation request message may be a one bit medium access control (MAC) layer control element embedded in an UL MAC packet data unit (PDU). In such embodiments, the one bit MAC control element may include (or comprise) the first information.

At 1704, the UE may receive, from the base station, a sub-frame allocation. The sub-frame allocation may be a first sub-frame allocation (e.g., the UE may receive more than one sub-frame allocation). In addition, the sub-frame allocation may be based at least in part on the first information. In other words, the sub-frame allocation may be based on at least the first information received from the UE.

In some embodiments, the sub-frame allocation may be received via a sub-frame allocation request message. In such embodiments, the sub-frame allocation request message may be a first MAC control element embedded in a DL MAC PDU and the first MAC control element may include (or comprise) the first allocation. In some embodiments, the first allocation may indicate which UL sub-frames in the allocation period are assigned to the UE and which DL sub-frames in the allocation period are assigned to UE. In addition, the first MAC control element may also include (or comprise) at least one of a start system frame number (SFN) for the allocation period, a bitmap indicating hybrid automatic repeat request (HARQ) acknowledge/not acknowledge (ACK/NAK) status for current UL HARQ processes, and/or a bitmap indicating the first information.

In some embodiments, a HARQ process corresponding to a first bit in the bitmap may be mapped to the first UL sub-frame in the allocation period. In addition, an SFN of the first UL sub-frame may be calculated based on the start SFN. Further, in some embodiments, the bitmap may include (or comprise) ones indicating allocated UL sub-frames and zeros indicating DL sub-frames. Additionally, the bitmap may include (or comprise) 8 bits if the bitmap indicates a frequency division duplex (FDD) frame or 10 bits if the bitmap indicates a time division duplex (TDD) frame.

In some embodiments, the method may also include the UE merging an un-allocated UL sub-frame's downlink association set with a next closest allocated UL sub-frame's downlink association set. In such embodiments, the UE may receive a downlink assignment index (DAI). In some embodiments, the DAI may represent a total number of downlink DL sub-frames to be acknowledged/not acknowledged (ACK/NAK) in a merged downlink association set for a particular downlink control information (DCI) format, such as DCI format 0, and a cumulative number of DL sub-frames to be ACK/NAK in the merged downlink association set for another DCI format. Additionally, the merged DL association set may include the un-allocated UL sub-frame's downlink association set and the next closest allocated UL sub-frame's downlink association set.

In some embodiments, the method may further include the UE suspending lower priority UL data. In such embodiments, the lower priority UL data may include (or comprise) non time-sensitive data.

In some embodiments, the method may further include the UE transmitting second information. The second information may confirm the first sub-frame allocation. In some embodiments, the second information may be transmitted via an allocation configuration complete message. In addition, the allocation configuration complete massage may be a second MAC control element embedded in a second UL MAC PDU. The second MAC control element may include (or comprise) a bitmap indicating HARQ ACK/NAK status for DL HARQ processes.

Figure 13B:
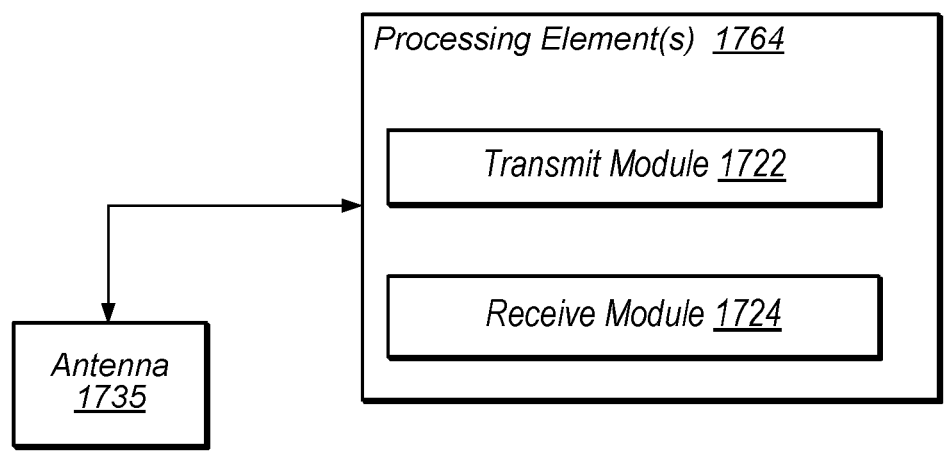
FIG. 13B illustrates a processing element including modules for a user equipment device (UE) to request a sub-frame allocation, according to some embodiments.

FIG. 13B illustrates a processing element including modules for a user equipment device (UE) to request a sub-frame allocation, according to some embodiments. In some embodiments, antenna 1735 may be coupled to processing element 1764. The processing element may be configured to perform the method described above in reference to FIG. 13A. In some embodiments, processing element 1764 may include one or more modules, such as modules (or circuitry) 1722-1724, and the modules (or circuitry) may be configured to perform various steps of the method described above in reference to FIG. 13A. In some embodiments, the processing element may be included in a UE, such as UE 106, or in a radio of a UE, such as radio 330. As shown, the modules may be configured as follows.

In some embodiments, processing element 1764 may include a transmit module 1722 configured to transmit first information to a base station, such as base station 102. The first information may include a maximum number of uplink (UL) sub-frames the UE can transmit in an allocation period. In some embodiments, the first information may be transmitted via a sub-frame allocation request message. In addition, the sub-frame allocation request message may be a one bit medium access control (MAC) layer control element embedded in an UL MAC packet data unit (PDU). In such embodiments, the one bit MAC control element may include (or comprise) the first information.

In some embodiments, processing element 1764 may include a receive module 1724 configured to receive, from the base station, a sub-frame allocation. The sub-frame allocation may be a first sub-frame allocation (e.g., the UE may receive more than one sub-frame allocation). In addition, the sub-frame allocation may be based at least in part on the first information. In other words, the sub-frame allocation may be based on at least the first information received from the processing element.

In some embodiments, receive module 1724 may be further configured to receive the sub-frame allocation via a sub-frame allocation request message. In such embodiments, the sub-frame allocation request message may be a first MAC control element embedded in a DL MAC PDU and the first MAC control element may include (or comprise) the first allocation. In some embodiments, the first allocation may indicate which UL sub-frames in the allocation period are assigned to the UE and which DL sub-frames in the allocation period are assigned to UE. In addition, the first MAC control element may also include (or comprise) at least one of a start system frame number (SFN) for the allocation period, a bitmap indicating hybrid automatic repeat request (HARQ) acknowledge/not acknowledge (ACK/NAK) status for current UL HARQ processes, and/or a bitmap indicating the first information.

In some embodiments, a HARQ process corresponding to a first bit in the bitmap may be mapped to the first UL sub-frame in the allocation period. In addition, an SFN of the first UL sub-frame may be calculated based on the start SFN. Further, in some embodiments, the bitmap may include (or comprise) ones indicating allocated UL sub-frames and zeros indicating DL sub-frames. Additionally, the bitmap may include (or comprise) 8 bits if the bitmap indicates a frequency division duplex (FDD) frame or 10 bits if the bitmap indicates a time division duplex (TDD) frame.

In some embodiments, the processor may include a module configured to merge an un-allocated UL sub-frame's downlink association set with a next closest allocated UL sub-frame's downlink association set. In such embodiments, the processing element may receive a downlink assignment index (DAI) (e.g., via receive module 1724). In some embodiments, the DAI may represent a total number of downlink DL sub-frames to be acknowledged/not acknowledged (ACK/NAK) in a merged downlink association set for a particular downlink control information (DCI) format, such as DCI format 0, and a cumulative number of DL sub-frames to be ACK/NAK in the merged downlink association set for another DCI format. Additionally, the merged DL association set may include the un-allocated UL sub-frame's downlink association set and the next closest allocated UL sub-frame's downlink association set.

In some embodiments, the processing element may include a module configured to suspend lower priority UL data. In such embodiments, the lower priority UL data may include (or comprise) non time-sensitive data.

In some embodiments, the processing element may include a module configured to transmit second information. The second information may confirm the first sub-frame allocation. In some embodiments, the second information may be transmitted via an allocation configuration complete message. In addition, the allocation configuration complete massage may be a second MAC control element embedded in a second UL MAC PDU. The second MAC control element may include (or comprise) a bitmap indicating HARQ ACK/NAK status for DL HARQ processes.

It is apparent for those skilled in the art that, for the particular processes of the modules (or circuitry) described above (such as modules 1722 and 1724), reference may be made to the corresponding steps (such as steps 1702 and 1704, respectively) in the related process embodiment sharing the same concept and the reference is regarded as the disclosure of the related modules (or circuitry) as well. Furthermore, processing element 1764 may be implemented in software, hardware or combination thereof. More specifically, processing element 1764 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 1764 may be implemented as a general-purpose processor such as a CPU, and therefore each module can be implemented with the CPU executing instructions stored in a memory which perform a respective step.

Figure 14A:
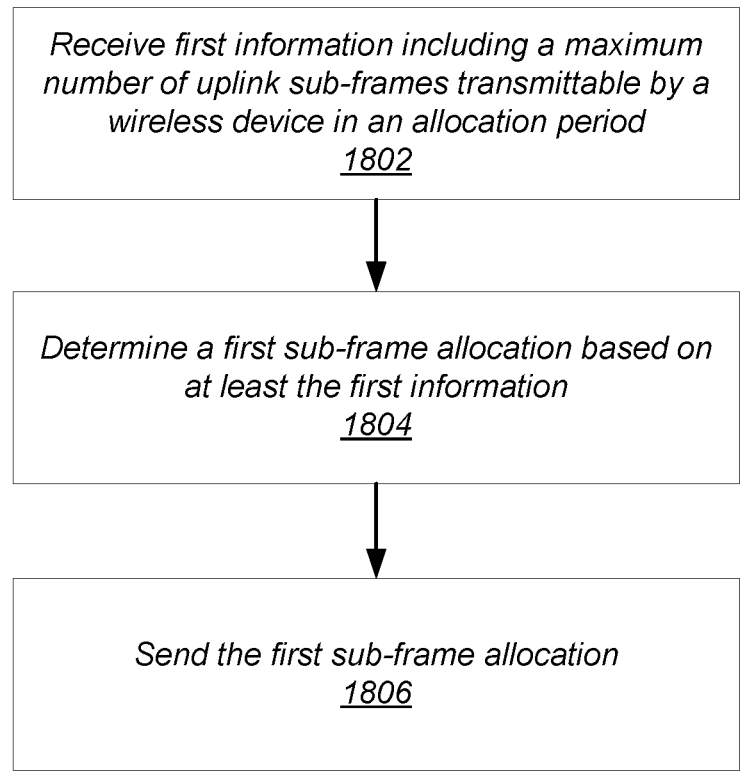
FIG. 14A illustrates a method for a base station to determine a sub-frame allocation, according to some embodiments.

FIG. 14A illustrates a method for a base station to determine a sub-frame allocation, according to some embodiments. The method shown in FIG. 14A may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1802, a base station, such as base station 102, may receive first information from a wireless device or user equipment device (UE), such as UE 106. The first information may include (or comprise) a maximum number of uplink (UL) sub-frames the UE can transmit in an allocation period. In some embodiments, the first information may be received via a sub-frame allocation request message. In addition, the sub-frame allocation request message may be a one bit medium access control (MAC) layer control element embedded in an UL MAC packet data unit (PDU). In such embodiments, the one bit MAC control element may include (or comprise) the first information.

At 1804, the base station may determine a first sub-frame allocation based on at least the first information. In some embodiments, the first sub-frame allocation may also be based on network traffic, e.g., sub-frame allocations for other UEs served by the base station.

At 1806, the base station may send the first sub-frame allocation to the UE. In some embodiments, the sub-frame allocation may be sent (or transmitted) via a sub-frame allocation request message. In such embodiments, the sub-frame allocation request message may be a first MAC control element embedded in a DLMAC PDU and the first MAC control element may include (or comprise) the first allocation. In some embodiments, the first allocation may indicate which UL sub-frames in the allocation period are assigned to the UE and which DL sub-frames in the allocation period are assigned to UE. In addition, the first MAC control element may also include (or comprise) at least one of a start system frame number (SFN) for the allocation period, a bitmap indicating hybrid automatic repeat request (HARQ) acknowledge/not acknowledge (ACK/NAK) status for current UL HARQ processes, and/or a bitmap indicating the first information.

In some embodiments, a HARQ process corresponding to a first bit in the bitmap may be mapped to the first UL sub-frame in the allocation period. Further, in some embodiments, the bitmap may include (or comprise) ones indicating allocated UL sub-frames and zeros indicating DL sub-frames. Additionally, the bitmap may include (or comprise) 8 bits if the bitmap indicates a frequency division duplex (FDD) frame or 10 bits if the bitmap indicates a time division duplex (TDD) frame.

In some embodiments, the base station may transmit a downlink assignment index (DAI). In some embodiments, the DAI may represent a total number of downlink DL sub-frames to be acknowledged/not acknowledged (ACK/NAK) in a merged downlink association set for a particular downlink control information (DCI) format, such as DCI format 0, and a cumulative number of DL sub-frames to be ACK/NAK in the merged downlink association set for another DCI format. Additionally, the merged DL association set may include the un-allocated UL sub-frame's downlink association set and the next closest allocated UL sub-frame's downlink association set.

In some embodiments, the method may further include the base station receiving second information. The second information may confirm the first sub-frame allocation. In some embodiments, the second information may be received via an allocation configuration complete message. In addition, the allocation configuration complete massage may be a second MAC control element embedded in a second UL MAC PDU. The second MAC control element may include (or comprise) a bitmap indicating HARQ ACK/NAK status for DL HARQ processes.

Figure 14B:
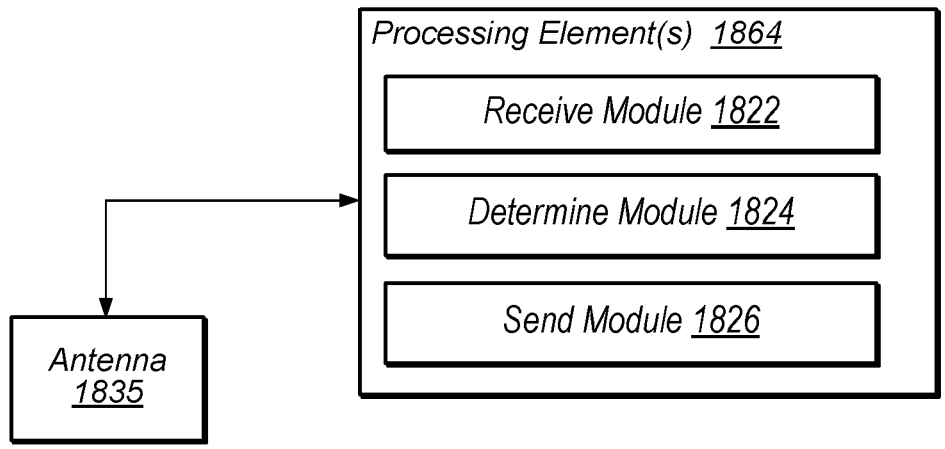
FIG. 14B illustrates a processing element including modules for a base station to determine a sub-frame allocation, according to some embodiments.

FIG. 14B illustrates a processing element including modules for a base station to determine a sub-frame allocation, according to some embodiments. In some embodiments, antenna 1835 may be coupled to processing element 1864. The processing element may be configured to perform the method described above in reference to FIG. 14A. In some embodiments, processing element 1864 may include one or more modules, such as modules (or circuitry) 1822-1824, and the modules (or circuitry) may be configured to perform various steps of the method described above in reference to FIG. 14A. In some embodiments, the processing element may be included in a base station, such as base station 102, or in a radio of a base station, such as radio 430. As shown, the modules may be configured as follows.

In some embodiments, processing element 1864 may include a receive module 1822 configured to receive first information from a wireless device or user equipment device (UE), such as UE 106. The first information may include (or comprise) a maximum number of uplink (UL) sub-frames the UE can transmit in an allocation period. In some embodiments, the first information may be received via a sub-frame allocation request message. In addition, the sub-frame allocation request message may be a one bit medium access control (MAC) layer control element embedded in an UL MAC packet data unit (PDU). In such embodiments, the one bit MAC control element may include (or comprise) the first information.

In some embodiments, processing element 1864 may include a determine module 1824 configured to determine a first sub-frame allocation based on at least the first information. In some embodiments, the first sub-frame allocation may also be based on network traffic, e.g., sub-frame allocations for other UEs served by the base station.

In some embodiments, processing element 1864 may include a send module 1806 configured to send the first sub-frame allocation to the UE. In some embodiments, the sub-frame allocation may be sent (or transmitted) via a sub-frame allocation request message. In such embodiments, the sub-frame allocation request message may be a first MAC control element embedded in a DLMAC PDU and the first MAC control element may include (or comprise) the first allocation. In some embodiments, the first allocation may indicate which UL sub-frames in the allocation period are assigned to the UE and which DL sub-frames in the allocation period are assigned to UE. In addition, the first MAC control element may also include (or comprise) at least one of a start system frame number (SFN) for the allocation period, a bitmap indicating hybrid automatic repeat request (HARQ) acknowledge/not acknowledge (ACK/NAK) status for current UL HARQ processes, and/or a bitmap indicating the first information.

In some embodiments, a HARQ process corresponding to a first bit in the bitmap may be mapped to the first UL sub-frame in the allocation period. Further, in some embodiments, the bitmap may include (or comprise) ones indicating allocated UL sub-frames and zeros indicating DL sub-frames. Additionally, the bitmap may include (or comprise) 8 bits if the bitmap indicates a frequency division duplex (FDD) frame or 10 bits if the bitmap indicates a time division duplex (TDD) frame.

In some embodiments, the processing element may include a module configured to transmit a downlink assignment index (DAI). In some embodiments, the DAI may represent a total number of downlink DL sub-frames to be acknowledged/not acknowledged (ACK/NAK) in a merged downlink association set for a particular downlink control information (DCI) format, such as DCI format 0, and a cumulative number of DL sub-frames to be ACK/NAK in the merged downlink association set for another DCI format. Additionally, the merged DL association set may include the un-allocated UL sub-frame's downlink association set and the next closest allocated UL sub-frame's downlink association set.

In some embodiments, the processing element may include a module configured to receive second information. The second information may confirm the first sub-frame allocation. In some embodiments, the second information may be received via an allocation configuration complete message. In addition, the allocation configuration complete massage may be a second MAC control element embedded in a second UL MAC PDU. The second MAC control element may include (or comprise) a bitmap indicating HARQ ACK/NAK status for DL HARQ processes.

It is apparent for those skilled in the art that, for the particular processes of the modules (or circuitry) described above (such as modules 1822, 1824, and 1826), reference may be made to the corresponding steps (such as steps 1802, 1804, and 1806, respectively) in the related process embodiment sharing the same concept and the reference is regarded as the disclosure of the related modules (or circuitry) as well. Furthermore, processing element 1864 may be implemented in software, hardware or combination thereof. More specifically, processing element 1864 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 1864 may be implemented as a general-purpose processor such as a CPU, and therefore each module can be implemented with the CPU executing instructions stored in a memory which perform a respective step.

Further Embodiments

In some embodiments, a user equipment device (UE) may include means for transmitting first information comprising a maximum number of uplink (UL) sub-frames the UE can transmit in an allocation period and means for receiving, from a base station, a first sub-frame allocation based on at least the first information.

In such embodiments the first information may be transmitted via a sub-frame allocation request message. The sub-frame allocation request message may be a one bit medium access control (MAC) layer control element embedded in a first uplink (UL) MAC packet data unit (PDU), wherein the one bit MAC control element may comprise the first information.

In some embodiments, the UE may further include means for merging an un-allocated UL sub-frame's downlink association set with a next closest allocated UL sub-frame's downlink association set.

In some embodiments, the UE may further include means for receiving a downlink assignment index (DAI), wherein the DAI represents a total number of downlink (DL) sub-frames to be acknowledged/not acknowledged (ACK/NAK) in a merged downlink association set for downlink control information (DCI) format 0 and a cumulative number of DL sub-frames to be ACK/NAK in the merged downlink association set for DCI format x, wherein the merged downlink association set may comprise the un-allocated UL sub-frame's downlink association set and the next closest allocated UL sub-frame's downlink association set.

In some embodiments, the UE may further include means for suspending lower priority UL data, wherein the lower priority UL data may comprise non time-sensitive data.

In some embodiments, the first allocation may be received via a sub-frame allocation request message and the sub-frame allocation request message may be a first MAC control element embedded in a downlink (DL) MAC PDU, wherein the first MAC control element may comprise the first allocation. In addition, the first allocation indicates which UL sub-frames in the allocation period are assigned to the UE and which DL sub-frames in the allocation period are assigned to UE.

In some embodiments, the first MAC control element may further comprise at least one of a start system frame number (SFN) for the allocation period, a bitmap indicating hybrid automatic repeat request (HARQ) acknowledge/not acknowledge (ACK/NAK) status for current UL HARQ processes, and a bitmap indicating the first information.

In some embodiments, a HARQ process corresponding to a first bit in the bitmap may be mapped to the first UL sub-frame in the allocation period, an SFN of the first UL sub-frame may be calculated based on the start SFN, and the bitmap may comprise ones indicating allocated UL sub-frames and zeros indicating DL sub-frames.

In some embodiments, the bitmap may comprise 8 bits for frequency division duplex (FDD) frames or 10 bits for time division duplex (TDD) frames.

In some embodiments, the UE may further include means for transmitting second information confirming the first sub-frame allocation. The second information may be transmitted via an allocation configuration complete message. The allocation configuration complete message may be a second MAC control element embedded in a second UL MAC PDU. The second MAC control element may comprise a bitmap indicating HARQ ACK/NAK status for DL HARQ processes.

In some embodiments, the UE may further include means for performing voice and/or data communications via time division duplexing (TDD) frames and the allocation period may comprise 10 sub-frames.

In some embodiments, the UE may further include means for performing voice and/or data communications via frequency division duplexing (FDD) frames and the allocation period may comprise 8 sub-frames.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer program, if executed by a computer system, may cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions or a computer program, where the processor is configured to read and execute the program instructions or computer program from the memory medium, where the program instructions are, or computer program is, executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A user equipment device (UE), comprising:
at least one antenna;
at least one radio, wherein the at least one radio is configured to perform cellular communication using at least one radio access technology (RAT);
one or more processors coupled to the at least one radio, wherein the one or more processors and the at least one radio are configured to perform voice and/or data communications;
wherein the one or more processors and the at least one radio are configured to:
receive, from a base station, a first sub-frame allocation for an allocation period, wherein the sub-frame allocation is based on pending data buffer status reports, wherein the sub-frame allocation allocates more uplink (UL) sub-frames than the UE is capable of transmitting on;
transmit, to the base station, first information comprising an indication of a maximum number of UL sub-frames the UE is capable of transmitting on in the allocation period, wherein the maximum number of UL sub-frames is based, at least in part, on power requirements for transmission of the UL sub-frames, and wherein the maximum number of UL sub-frames is less than the number of UL sub-frames allocated by the base station;
receive, from a base station, a second sub-frame allocation based on at least the first information, wherein the second sub-frame allocation allocates a number of UL sub-frames less than or equal to the maximum number of UL sub-frames the UE is capable of transmitting on in the allocation period; and
suspend at least new transmissions of lower priority UL data, wherein the lower priority UL data comprises non time-sensitive data.

2. The UE of claim 1,
wherein the first information is transmitted via a sub-frame allocation request message.

3. The UE of claim 2,
wherein the sub-frame allocation request message is an eight bit medium access control (MAC) layer control element embedded in a first uplink (UL) MAC packet data unit (PDU), wherein the eight bit MAC control element comprises the first information.

4. The UE of claim 1,
wherein the second sub-frame allocation indicates which UL sub-frames in the allocation period are assigned to the UE and which DL sub-frames in the allocation period are assigned to UE.

5. The UE of claim 1, wherein the second sub-frame allocation is received via a sub-frame allocation request message.

6. The UE of claim 5,
wherein the sub-frame allocation request message is a MAC control element embedded in a downlink (DL) MAC packet data unit (PDU), wherein the MAC control element comprises the second sub-frame allocation.

7. The UE of claim 6,
wherein the MAC control element further comprises at least one of:
a start system frame number (SFN) for the allocation period;
a bitmap indicating hybrid automatic repeat request (HARQ) acknowledge/not acknowledge (ACK/NAK) status for current UL HARQ processes; and
a bitmap indicating the first information.

8. The UE of claim 7,
wherein a HARQ process corresponding to a first bit in the bitmap is mapped to a first UL sub-frame in the second sub-frame allocation period.

9. The UE of claim 7,
wherein an SFN of the first UL sub-frame is calculated based on the start SFN.

10. The UE of claim 7,
wherein the bitmap comprises ones indicating allocated UL sub-frames and zeros indicating DL sub-frames.

11. The UE of claim 7,
wherein the bitmap comprises 8 bits for frequency division duplex (FDD) frames or 10 bits for time division duplex (TDD) frames.

12. An apparatus, comprising:
a memory; and
a processor in communication with the memory, wherein the processor is configured to:
  generate instructions to transmit an indication of a reduction in a maximum number of uplink (UL) sub-frames that can be transmitted in an allocation period to a base station, wherein the reduction is based, at least in part, on power requirements for transmission of the UL sub-frames, and wherein the maximum number of UL sub-frames, after reduction, is less than a number of UL sub-frames previously allocated by the base station for the allocation period;
  receive a first sub-frame allocation based on at least the indication of the reduction in the maximum number of UL sub-frames that can be transmitted in an allocation period, wherein the first sub-frame allocation allocates a number of UL sub-frames less than or equal to the maximum number of UL sub-frames, after reduction, that can be transmitted in the allocation period;
  generate instructions to transmit a confirmation of the first sub-frame allocation to the base station; and
  generate instructions to suspend at least new transmissions of lower priority UL data, wherein the lower priority UL data comprises non time-sensitive data.

13. The apparatus of claim 12,
wherein the first sub-frame allocation indicates which UL sub-frames in the allocation period are assigned to the apparatus and which DL sub-frames in the allocation period are assigned to apparatus.

14. The apparatus of claim 12,
wherein the confirmation is transmitted via an allocation configuration complete message.

15. The apparatus of claim 14,
wherein the allocation configuration complete message is a medium access control (MAC) layer control element embedded in an uplink (UL) MAC packet data unit (PDU).

16. The apparatus of claim 15,
wherein the MAC control element comprises a bitmap indicating hybrid automatic repeat request (HARQ) acknowledge/not acknowledge (ACK/NAK) status for downlink (DL) HARQ processes.

17. A non-transitory computer readable memory medium storing program instructions executable by a processor of a user equipment device (UE) to:
  generate instructions to transmit, to a base station, first information comprising an indication of a reduction in a maximum number of uplink (UL) sub-frames the UE capable of transmitting on in an allocation period, wherein the reduction in the maximum number of UL sub-frames is based, at least in part, on power requirements for transmission of the UL sub-frames, and wherein the maximum number of UL sub-frames, after reduction, is less than a number of UL sub-frames previously allocated by the base station for the allocation period;
  receive, from the base station, a first sub-frame allocation based on at least the first information, wherein the first sub-frame allocation allocates a number of UL sub-frames less than or equal to the maximum number of UL sub-frames, after reduction, that the UE is capable of transmitting on in the allocation period;
  generate instructions to suspend at least new transmissions of lower priority UL data, wherein the lower priority UL data comprises non time-sensitive data; and
  merge an un-allocated UL sub-frame's downlink association set with a next closest allocated UL sub-frame's downlink association set.

18. The non-transitory computer readable memory medium of claim 17,
wherein the program instructions are further executable by the processor to:
  receive a downlink assignment index (DAI), wherein the DAI represents a total number of downlink (DL) sub-frames to be acknowledged/not acknowledged (ACK/NAK) in a merged downlink association set for a first downlink control information (DCI) format and a cumulative number of DL sub-frames to be ACK/NAK in the merged downlink association set for a second DCI format.

19. The non-transitory computer readable memory medium of claim 18,
wherein the merged downlink association set comprises the un-allocated UL sub-frame's downlink association set and the next closest allocated UL sub-frame's downlink association set.

20. The non-transitory computer readable memory medium of claim 17,
wherein the first sub-frame allocation indicates which UL sub-frames in the allocation period are assigned to the apparatus and which DL sub-frames in the allocation period are assigned to apparatus.

* * * * *